United States Patent [19]
Bittinger et al.

[11] Patent Number: 5,859,971
[45] Date of Patent: *Jan. 12, 1999

[54] DIFFERENCING CLIENT/SERVER COMMUNICATION SYSTEM FOR USE WITH CGI FORMS

[75] Inventors: Reed Reed Bittinger; Michael Levi Fraenkel, both of Raleigh; Barron Cornelius Housel III, Chapel Hill; David Bruce Lindquist, Raleigh., all of N.C.

[73] Assignee: International Business Machines Corp., Armonk, N.Y.

[*] Notice: The term of this patent shall not extend beyond the expiration date of Pat. No. 5,754,774.

[21] Appl. No.: 601,903

[22] Filed: Feb. 15, 1996

[51] Int. Cl.$^6$ ....................................................... G06F 3/00
[52] U.S. Cl. ................................. 395/200.33; 395/200.48
[58] Field of Search ........................ 395/200.01, 200.48, 395/200.47, 200.33, 200

[56] References Cited

U.S. PATENT DOCUMENTS

| | | | |
|---|---|---|---|
| 5,193,162 | 3/1993 | Bordsen et al. | 711/152 |
| 5,241,625 | 8/1993 | Epard et al. | 345/502 |
| 5,473,772 | 12/1995 | Halliwell et al. | 395/712 |
| 5,574,906 | 11/1996 | Morris | 707/1 |
| 5,600,834 | 2/1997 | Howard | 707/201 |
| 5,611,038 | 3/1997 | Shaw et al. | 345/302 |

FOREIGN PATENT DOCUMENTS 0 665 670 A3   1/1995   European Pat. Off. ........ H04L 29/06

OTHER PUBLICATIONS

IBM Technical Disclosure Bulletin, Method to Reduce Changed Data Sent Between Computer Systems, vol. 35, No. 1B, pp. 110–112.

Austin, et al., File System Caching in Large Point–to–Point Networks, *Software Engineering Journal*, vol. 7, No. 1, pp. 65–80 (Jan. 1992).

Nelson, et al., Caching in the Sprite Network File System, *Operating Systems Review*, vol. 21, No. 5, pp. 3–4 (1987).

Huizinga, et al., Two–Level Client Caching and Disconnected Operation of Notebook Computers in Distributed Systems, *SIGICE Bulletin*, vol. 21, No. 1, pp. 9–14 (Jul. 1995).

Abstract, IBM Technical Disclosure Bulletin, Method for Transmitting Only Document Change Data, vol. 27, pp. 844–846 (Jun. 1984).

International Search Report.

(List continued on next page.)

*Primary Examiner*—Parshotam S. Lall
*Assistant Examiner*—Kenneth R. Coulter
*Attorney, Agent, or Firm*—Jerry W. Herndon

[57] ABSTRACT

A method, apparatus and computer program product for reducing the data transmitted over an external communication link from a first application resident in a first computer to a second application resident in a second computer. The method, apparatus and computer program product include storing a data stream from the first application to be provided to the second application in response to a request from the second application in a cache resident in the first computer to create a server base cache entry and in a cache resident in the second computer to create a client base cache entry. Requests from the second application are interrogated to determine if a client base cache entry corresponding to the interrogated request exists and to determine if a server base cache entry corresponding to the interrogated request exists. The response data stream is intercepted prior to transmission of the response on the external communication link and compared to the server base cache entry to provide difference data corresponding to the difference between the intercepted response and the server base cache entry. The difference data is sent over the external communication link and acquired by the second computer which reconstructs the response data stream by combining the client base cache entry with the difference data to create a response data stream which is provided to the second application.

48 Claims, 19 Drawing Sheets

OTHER PUBLICATIONS

Hyptertext Transfer Protocol—HTTP/1.0, HTTP Working Group, Berners–Lee et al.—Internet–Draft Basic HTTP.

IBM Sales Brochure G325–3598–0 printed Sep. 1995.

IBM Sales Brochure G325–3595–00, printed Sep. 1995.

IBM ARTour Technical Overview—Release 1.

IBM Publication SB14–0110–00, 1995.

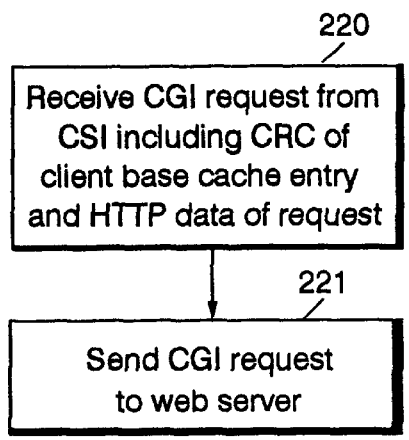
FIG. 9
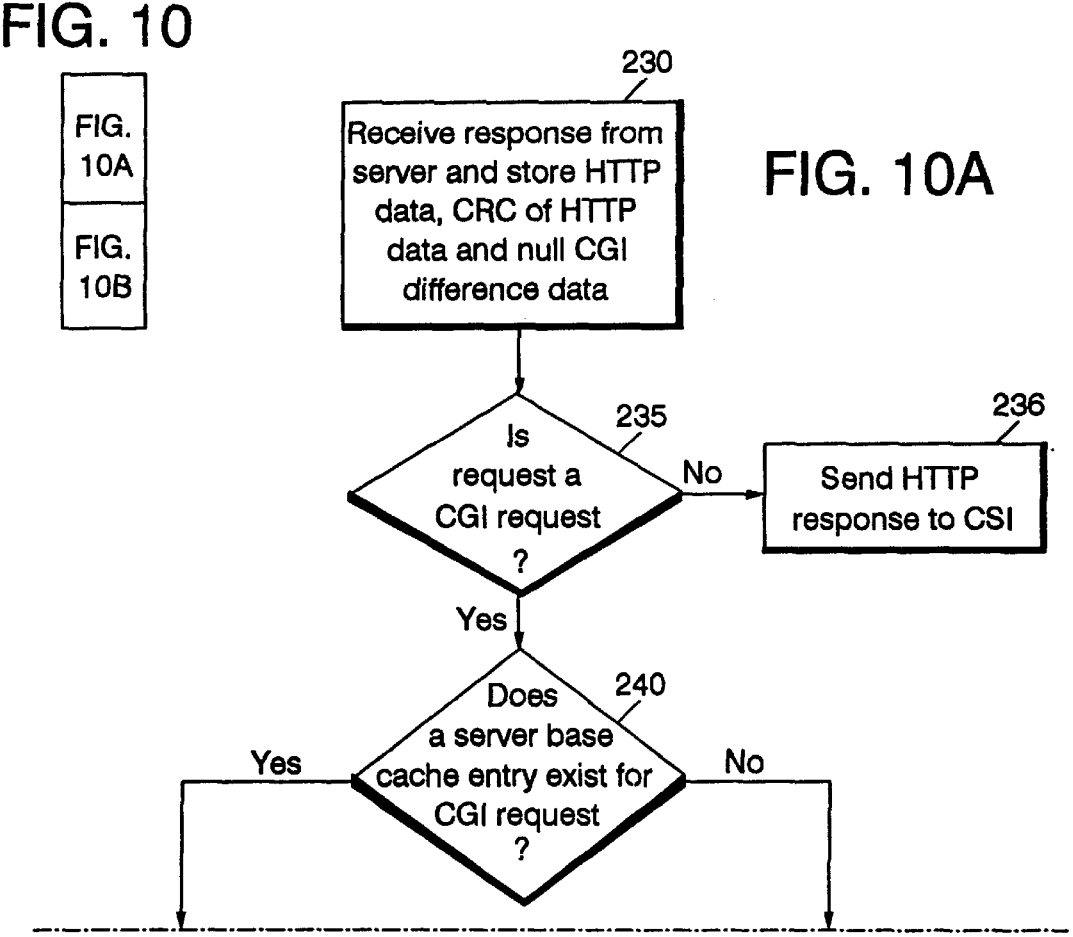
FIG. 10
FIG. 10A

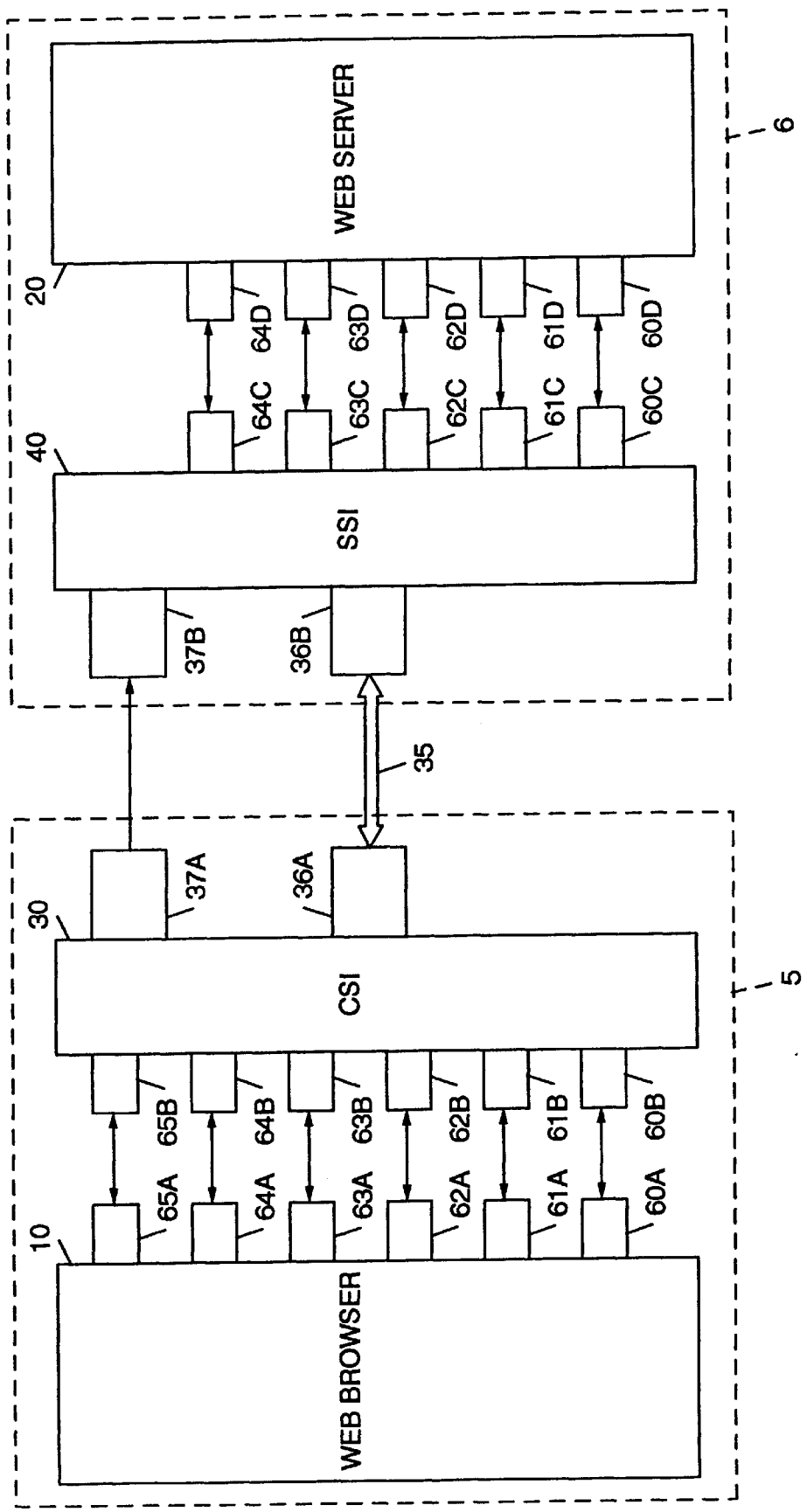

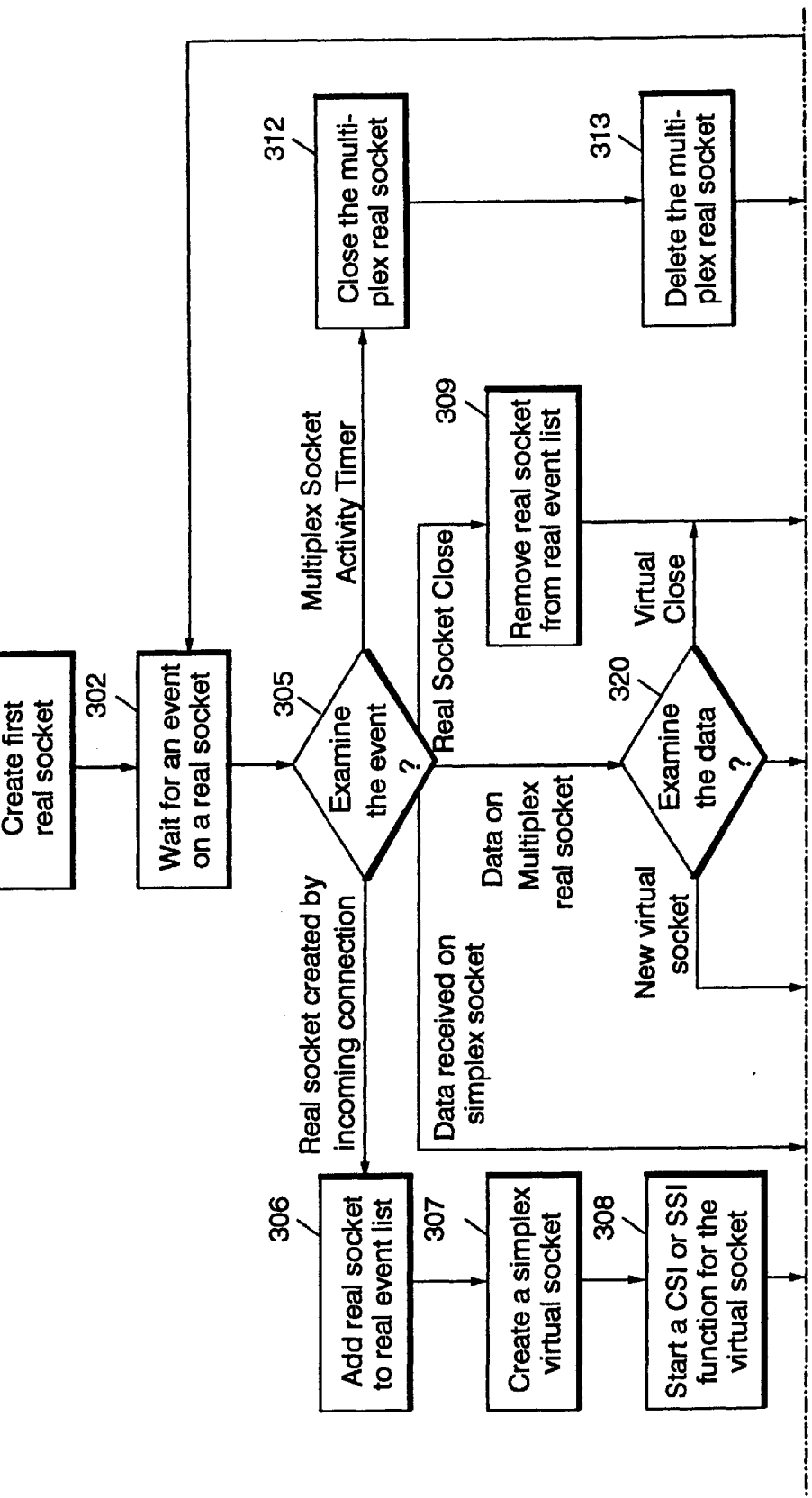

DIFFERENCING CLIENT/SERVER COMMUNICATION SYSTEM FOR USE WITH CGI FORMS

FIELD OF THE INVENTION

The present invention relates to methods of communicating between applications resident on different computers such as a web browser and a web server. More particularly the present invention relates to differencing methods of communication over an external communication link between two computers.

BACKGROUND OF THE INVENTION

The recent publicity and emphasis on the "information superhighway" has increased awareness and acceptance of the Internet as a mass communication media. This broad based recognition of the Internet as a viable media for communication and interaction across multiple networks has also created a large established user base built upon the Internet standardized protocols for interaction between computer networks.

The paradigm for the Internet is that of a client-server relationship where Internet clients (browsers) communicate with Internet servers. To provide greater access to the Internet the communication protocols and languages utilized by the clients and servers have become standardized. These protocols include the Hyper-Text Transfer Protocol (HTTP), which is the communication protocol used for communications between clients and servers, and the Transfer Control Protocol/Internet Protocol (TCP/IP) the TCP portion of which is the transport specific protocol for communication between computers or applications. Also standardized is the language in which clients and servers communicate which is called Hyper-Text Markup Language (HTML). Because these protocols and language are machine independent, and utilize a connectionless best-efforts protocol to sending information, each transaction is fully self contained. Thus, for example, each message from a client contains information about the capabilities of the browser and is independent of any other communications for the communication to be completed. This self-contained nature of the communications between a client and a server may be referred to as "stateless" communications and increases the amount of data which must be transferred between a client and a server for a given communication.

In the context of the World Wide Web client/server applications the client may be a web browser which acts as the user interface. The web browser sends user requests to the appropriate web server and formats and displays the HTML data returned from the web server. The web browser also evaluates the HTML data to determine if there are any embedded hyper-link statements in the HTML data which would require subsequent browser requests which would then be initiated by the browser. A web server acts as the server for the client and processes the web browsers requests and returns the requested response as an HTML data portion of a HTTP data stream.

As an example of a typical world wide web communication the case of a web browser initiating a request for a "home page" from the web server illustrates the basic relationship between HTTP, HTML, TCP and the web browser and server. When the user of the web browser requests information from a specific web site, the web browser initiates communication with the web server by sending a "get" request to the web server specifying the Universal Resource Locator (URL) of the desired web site which, for purposes of this example, may be a "home page." The URL acts as the address of the web site and is unique throughout the Internet. The web server would then obtain and supply the web browser with the HTML data corresponding to the home page specified by the URL. This operation may involve further communications on the Internet by the Internet web server or the URL may specify the server which is in the local network to which the browser is attached. The web browser would then evaluate the HTML data received as an HTTP data stream from the web server to see if there were any embedded hyper-links such as an icon or an image and, if such a hyper-link exists would initiate requests specifying the URL of the hyper-link to obtain the specified data. This data would then be incorporated into the home page and displayed to the user. As is seen in this simple example, a single user input request by a web browser may result in multiple additional requests which are automatically carried out by the web browser in response to the receipt of the HTML data corresponding to the user input request.

The basic communication structure for an Internet based system is depicted in FIG. 1. In FIG. 1 a web browser 10 communicates with a web server 20 over a communication link 15. This communication link is typically a local area network connection, wide area network connection, a connection over telephone lines or a combination thereof. The web browser 10 communicates with the web server 20 using TCP/IP. For the majority of Internet communications a web browser communicates with a web server using the generic communication protocol HTTP which is transmitted between the web browser and the web server over the TCP/IP link between the web browser and the web server. The actual data transferred between the web browser 10 and the web server 20 are HTTP data objects (e.g. HTML data) as described above. The web server 20 may be a proxy which receives web browser communications from a number of web browsers and routes them to the appropriate server.

The popularity of the web browser/web server and their common information and transport protocols, HTML and HTTP, has lead to rapid acceptance of web technology as a universal interface for network access to information. Furthermore, because the protocols and language for communication between web browsers and web servers are standardized the communication protocols and language will be the same whether a user is using Netscape Navigator™, NCSA Mosaic™, WebExplorer™ or any other web browser as their web browser to access network information. Therefore, the large installed user base for web browsers combined with the connectivity of the Internet and the ease of writing web application servers using the HTTP defined Common Gateway Interface (CGI)make web technology very attractive for a large class of forms-based applications.

At the same time that the Internet was growing in popularity and acceptance, mobile computing was also increasing in popularity. The use of laptops, notebooks, Personal Digital/Communication Assistants (PDAs/PCAs) and other portable devices has lead to an increase in demands for wireless communications. Wireless wide area networks, cellular communications and packet radio, however, suffer from common limitations if used in a web context. The high cost per byte of communications, slow response time, low bandwidth and unreliability all hamper use of wireless technology for the stateless communication protocol of the World Wide Web. Also, because the web protocol is stateless the amount of data per request and the number of communication requests transferred over the wireless connection are larger than would be necessary if the communication were not self contained. Thus, combining wireless technology, or any low-speed communication technology, with web technology seems impractical as the strength of the web technology in its universal nature exacerbates the weaknesses of the wireless technology.

OBJECTS AND SUMMARY OF THE INVENTION

In view of the above limitations it is one object of the present invention to provide a communication system which reduces the amount of data to be transferred between applications.

It is an additional object of the present invention to provide a communication system which may be used in a web browser/server environment.

It is a further object of the present invention to be compatible with existing communication protocols and languages in a low speed or wireless communication system without requiring modification of web browser or web server applications.

It is an additional object of the present invention to provide a communication system which reduces the amount of communication required between a web browser and a web server and thereby enhances performance of the communication system.

In view of these and other objects, the present invention provides a method of reducing the data transmitted over a communication link from a first application resident in a first computer and to a second application resident in a second computer where the data is transmitted over an external communication link from the first computer to the second computer. One aspect of the present invention includes storing a data stream from the first application to be provided to the second application in response to a request from the second application in a cache resident in the first computer to create a server base cache entry. The data stream to be provided to the second application in response to a request from the second application is also stored in a cache resident in the second computer to create a client base cache entry. Requests from the second application are evaluated to determine if a client base cache entry corresponding to the interrogated request exists to provide a client base form. Requests from the second application are also interrogated to determine if a server base cache entry corresponding to the interrogated request exists to provide a server base form. The data stream corresponding to the response originated by the first application in response to the interrogated request from the second application is intercepted prior to transmission of the response on the external communication link and compared to the server base form to provide difference data corresponding to the difference between the intercepted response and the server base form. The difference data is sent to the second computer over the external communication link and the difference data transmitted over the external communication link sent by the first computer is acquired from the external communication link. The response data stream corresponding to the communication from the first application is reconstructed from the client/server specific data stream received over the external communication link by combining the client base form with the difference data received over the external communication link to create a response data stream corresponding to the intercepted response. The reconstructed data stream corresponding to the intercepted response is provided to the second application.

In a further aspect of the present invention, the second computer determines if the server base form is identical to the client base form and the server base form and the difference data are transmitted to the second computer over the external communication link if the server base form is not identical to the client base form. The intercepted response data stream corresponding to the response from the first application is then reconstructed by combining the server base form received over the external communication link with the difference data received over the external communication link to create a data stream corresponding to the intercepted response. The client base form corresponding to the interrogated request is also updated by storing the received server base form as the client base cache entry corresponding to the interrogated request.

In a server rebasing aspect of the present invention, the first computer determines if the difference between the server base form and the intercepted response is greater than a predefined difference threshold. The server base form corresponding to the interrogated request is updated by storing the intercepted response data stream received from the first application as the server base cache entry corresponding to the intercepted request if the difference between the server base form and the intercepted response is greater than the predefined difference threshold. The comparison then utilizes the updated server base form.

In an alternative embodiment of the present invention, a plurality of server base cache entries which correspond to the request from the second application are maintained. A request from the second application is interrogated to determining if a plurality of server base cache entries exist corresponding to the request from the second application to provide a plurality of server base forms. The first computer determines if one of the plurality of server base forms is identical to the client base form and utilizes the one of the plurality of server base forms which is identical to the client base form if one of the plurality of server base forms is identical to the client base form.

An additional embodiment of the present invention includes updating the server cache entry with the data stream from the first application in response to the request from the second application. A plurality of difference data sets which correspond to the request from the second application and which represent the differences between successive server cache entries are maintained to provide archival difference data. A plurality of CRC entries are also maintained wherein each of the plurality of CRC entries is associated with one of the plurality of difference data sets and uniquely identify the server base form from which the difference data set was derived. If a plurality of difference data sets and CRCs exist corresponding to the request from the second application and if one of the plurality of CRCs corresponds to a server base form which is identical to the client base form the archival difference data corresponding to the CRC which corresponds to the client base form, the successive archival difference data sets and the difference data calculated for the current server base form and the response from the first application are sent to the second computer over the external communication link. The response data stream corresponding to the communication from the first application from the data stream received over the external communication link is reconstructed by successively combining the client base form with the difference data received over the external communication link to create a response data stream corresponding to the intercepted response. The client cache entry corresponding to the request from the second application is also updated with the reconstructed data stream.

In alternative embodiments of the present invention, the first application comprises a web server and the second application comprises a web browser. Alternatively, the external communication link comprises a wireless communication link. Furthermore, an alternative embodiment includes the request from the web browser comprising a CGI request.

As will be appreciated by those of skill in this art, the above described aspects of the present invention may also be provided as an apparatus or a program product having computer-readable program means.

BRIEF DESCRIPTION OF THE DRAWINGS

FIG. 9 is a flow diagram depicting operations carried out by a server-side intercept module in a preferred embodiment of the present invention implementing a differencing data transfer system;

FIG. 11 is a block diagram of one aspect of the present invention utilizing virtual sockets;

FIG. 16-1 is a flow diagram depicting the virtual create operation according to one embodiment of the present invention utilizing virtual sockets;

FIG. 16-2 is a flow diagram depicting the virtual send operation according to one embodiment of the present invention utilizing virtual sockets;

FIG. 16-3 is a flow diagram depicting the virtual receive operation according to one embodiment of the present invention utilizing virtual sockets;

FIG. 16-4 is a flow diagram depicting the virtual select operation according to one embodiment of the present invention utilizing virtual sockets;

FIG. 17-1 is a flow diagram depicting the virtual flush operation according to one embodiment of the present invention utilizing virtual sockets; and FIG. 17-2 is a flow diagram depicting the virtual close operation according to one embodiment of the present invention utilizing virtual sockets.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 3 to 10 and 13 to 17-2 are flowchart illustrations of methods and systems according to the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 2:
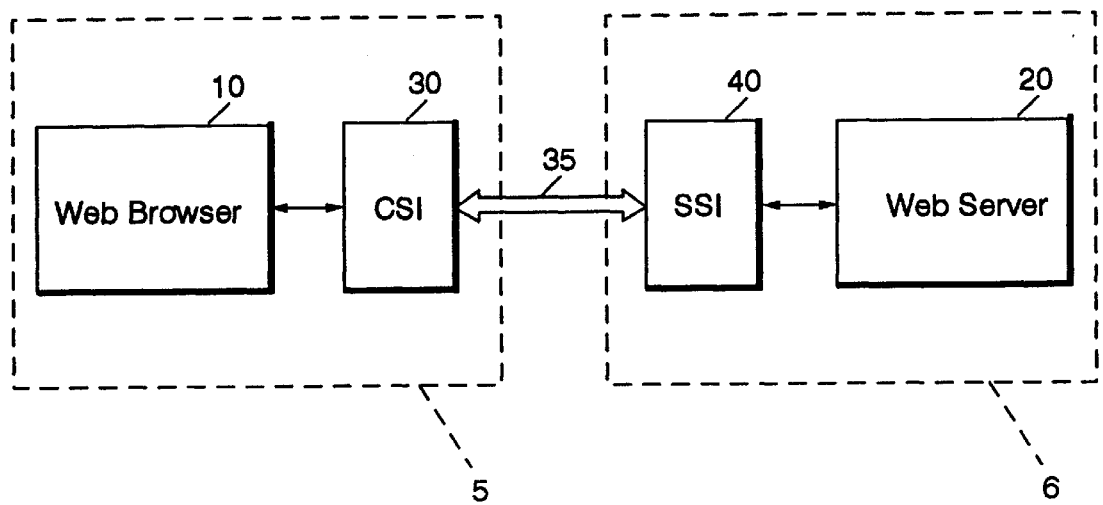
FIG. 2 is a block diagram of a web browser/web server system according to one embodiment of the present invention utilizing a client intercept and a server intercept.

FIG. 2 illustrates one embodiment of the present invention. As seen in FIG. 2, a web browser 10 communicates with a client-side intercept module 30. The web server 20 communicates with a server-side interrupt module 40. The client-side interrupt module 30 then communicates with the server-side interrupt module 40 over the communication link 35. The web browser 10 and the client-side intercept module 30 may be contained in a first computer 5. The server-side intercept module 40 and the web server 20 may be contained in a second computer 6. The first computer 5 and the second computer 6 communicate over external communication link 35.

Preferably, the web browser 10 is a Internet web browser utilizing hypertext transfer protocol (HTTP) and hypertext markup language (HTML) to communicate with an Internet web server 20 which also uses HTTP and HTML. In operation, the web browser 10 would output an HTTP data stream which is intercepted by the client-side intercept module 30. The intercept of the HTTP data stream by the client-side intercept module 30 may be accomplished through the use of the TCP/IP loop-back feature where the client side intercept module 30 resides at an IP address having a network number of 127, such as 127.0.0.1. The client-side intercept module 30 then converts or transforms the HTTP data stream into a client/server specific protocol and transmits the client/server specific data stream onto the external communication link 35. The server-side intercept module 40 receives the client/server specific data stream and reconstructs the original HTTP data stream corresponding to the web browser originated communication. This reconstructed HTTP data stream is then transferred to the web server 20. The web server 20 responds to the HTTP data stream in the normal manner of an Internet web server. As will be appreciated by one of skill in the art, the web server 20 may also be a proxy which allows multiple browsers to connect to the Internet.

When information is received by the web server 20 for transmission to the web browser 10, for example, in response to a browser request for a specific URL home page, the web server 20 outputs an HTTP data stream corresponding to the communication to be sent to the web browser 10. This web server originated communication is intercepted by the server-side intercept module 40 and transformed by a client/server specific data stream. The client/server specific data stream corresponding to the web server originated communication is then sent on the external communication link 35 from the second computer to the first computer. The client/server specific data stream is received by the client-side intercept module 30 and the original HTTP data stream corresponding to the web server originated communication is rebuilt and provided to the web browser 10.

In a particular embodiment of the present invention, the external communication link 35 is a wireless communication link. In such a case, in order to obtain system performance which is acceptable to users, it is desirable to reduce the amount of communication over the external communication link 35 both in the frequency of the communications and in the amount of information which must be transferred over the communication link 35. Accordingly, the present invention utilizes caching, differencing, and protocol reduction techniques to minimize the amount of communication required over the external communication link 35. These techniques are accomplished by converting the stateless or stochastic protocols of HTTP into a client/server specific protocol which utilizes information specific to the client and the server to reduce the amount and frequency of communications.

While the present invention has and will be described with respect to a single web browser application and a single web server application, as will be appreciated by those of skill in this art, the benefits and advantages of the present invention may also be achieved with multiple web browsers associated with a single web server. Thus, the methods, apparatus and program products of the present invention in connection with multiple browsers each communicating with a client-side intercept module and these client side intercept modules would then communicate with the server-side intercept module of the web server or web proxy.

In one embodiment of the present invention, both the client-side intercept module 30 and the server-side intercept module 40 have cache storage capabilities. The client cache resident in the first computer stores HTTP data streams to be received by the web browser in response to a web browser originated communication. The server cache resident in the second computer stores HTTP data streams which are received from the web server in response to a browser originated communication.

As will be appreciated by one of skill in the art, the cache resident in the first computer or the second computer may be of any size based upon the specific hardware configurations of the computers. These caches store information for each communication including, the URL of the communication, a unique identifier based on the communications contents such as a cyclic redundancy check (CRC) of the data of the communication, the store date time (SDT) indicating the time when the cache entry was created or refreshed and the data of the communication. Thus, a directory of cache entries may be created for each communication stored in the cache. Furthermore, because of the limited resources available in any given hardware configuration, any number of caching techniques known to one of skill in the art for maintaining the caches resident in the first computer and the second computer may be utilized. Thus, for example, the cache may invalidate the oldest directory entry if a user defined cache size would be exceeded by the addition of a new entry and then the new entry added in place of the invalidated entry. Furthermore, cache entries may be maintained over multiple instances of the web browser or web server applications or even power-on cycles of the first or second computers to create a persistent cache.

The operation of the caching structure according to one aspect of the present invention will be now be described with reference to FIGS. 3 through 6, which are flowcharts describing the operation of the client-side intercept module 30 and the server-side intercept module 40.

Figure 3:
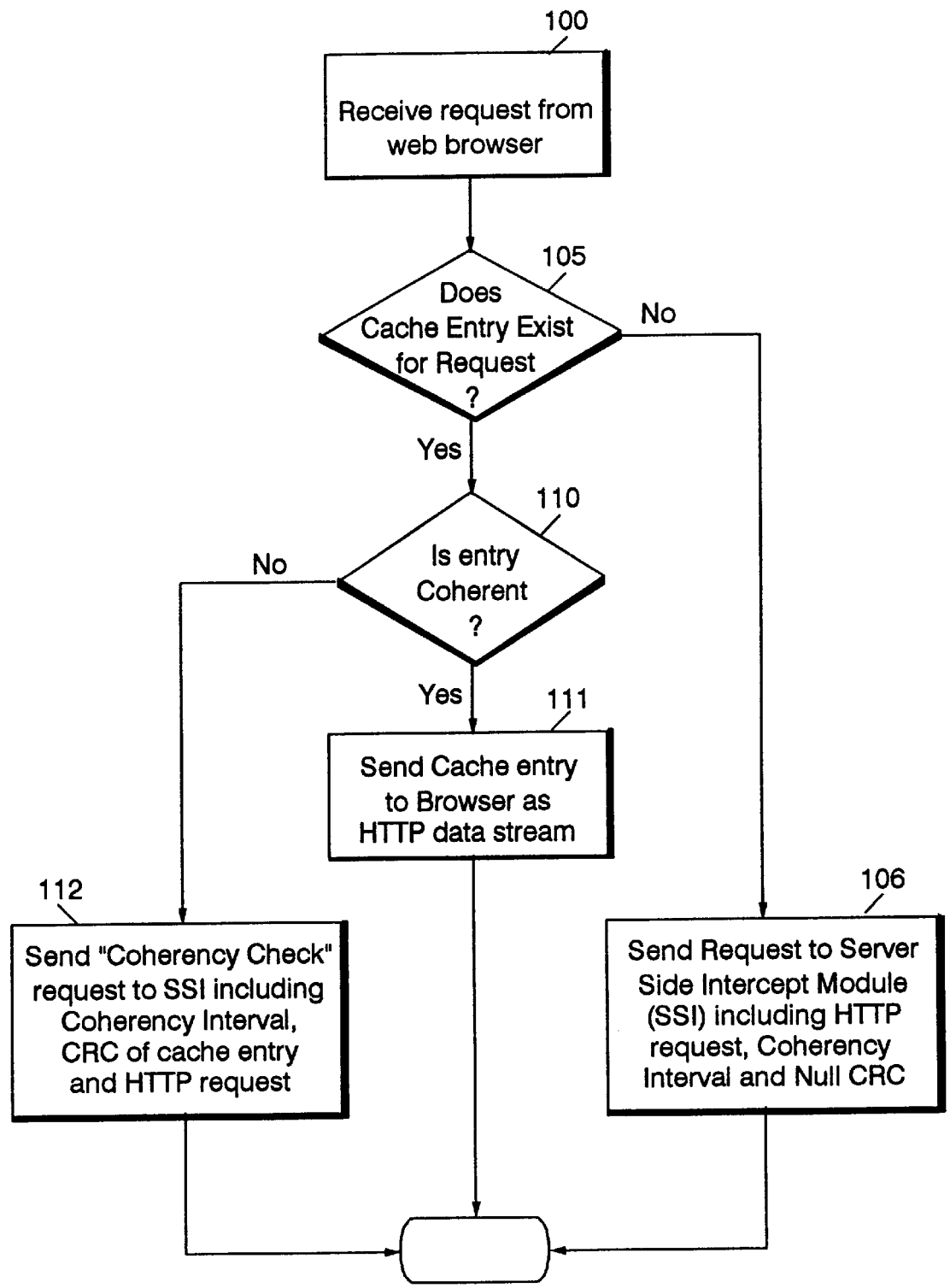
FIG. 3 is a flow diagram depicting operations carried out by a client-side intercept module in a preferred embodiment of the present invention implementing a coherent caching system.

Specifically with reference to FIG. 3, block 100 indicates that the client-side intercept module 30 has received a request from the web browser 10. This request may take the form of an HTTP data stream. The client-side intercept module 30 checks the uniform resource locator (URL) of the incoming request as is reflected in block 105. The client-side intercept module 30 determines from the URL if the information corresponding to the web browser originated request has previously been stored in the client cache resident in the first computer.

If the information corresponding to the URL has not been previously stored in the client cache, then the operations depicted in block 106 are carried out by the client-side intercept module. The client-side intercept module 30 transmits a request on the external communication link 35 to the server-side intercept module 40.

If, however, upon interrogating the web browser originated communication as depicted in block 105 a client cache entry exists which corresponds to the web browser originating communication, then in the simplest embodiment this information would be provided to the web browser as an HTTP data stream. However, as reflected in FIG. 3, the preferred embodiment of the present invention performs what is referred to herein as a coherency interval check on the cache entry corresponding to the web browser originated communication. This operation is reflected in block 110 of FIG. 3.

The coherency interval for a client-side intercept module may be user defined and is the length of time which a cache entry may exist before it becomes stale and, even if present, must be refreshed by requesting the information corresponding to the web browser originated communication from the web server. The coherency interval check reflected in block 110 may be carried out by comparing the current date and time to the sum of the SDT of the cache entry corresponding to the web browser originated communication and the coherency interval specified by the user. If the current date and time is greater than this sum then the information stored in the cache corresponding to the web browser originated communication has become stale and the "No" branch of block 110 is taken. However, if the current date and time is less than the sum of the SDT plus the user defined coherency interval, then the "Yes" branch of block 110 is taken and, as reflected in block 111, the cache entry is supplied to the browser as an HTTP data stream. Thus completing the browser originated communication received by the client-side intercept module 30 in block 100 of FIG. 3.

If the coherency interval check reflected in block 110 determines that the cache entry resident in the first computer is stale, then a request is made to the server-side intercept module 40 to check the coherency of the cache entry resident in the second computer. This operation is reflected in block 112 of FIG. 3. This is accomplished by supplying across the external communication link 35 to the server-side intercept module 40 the coherency interval for the particular client-side intercept module 30 the HTTP request originated by the web browser 10 and a unique indicia of the contents of the client cache corresponding to the URL of the web browser originated communication. In a preferred embodiment, this unique indicia is the results of a cyclic redundancy check or CRC for the cache entry.

Figure 5:
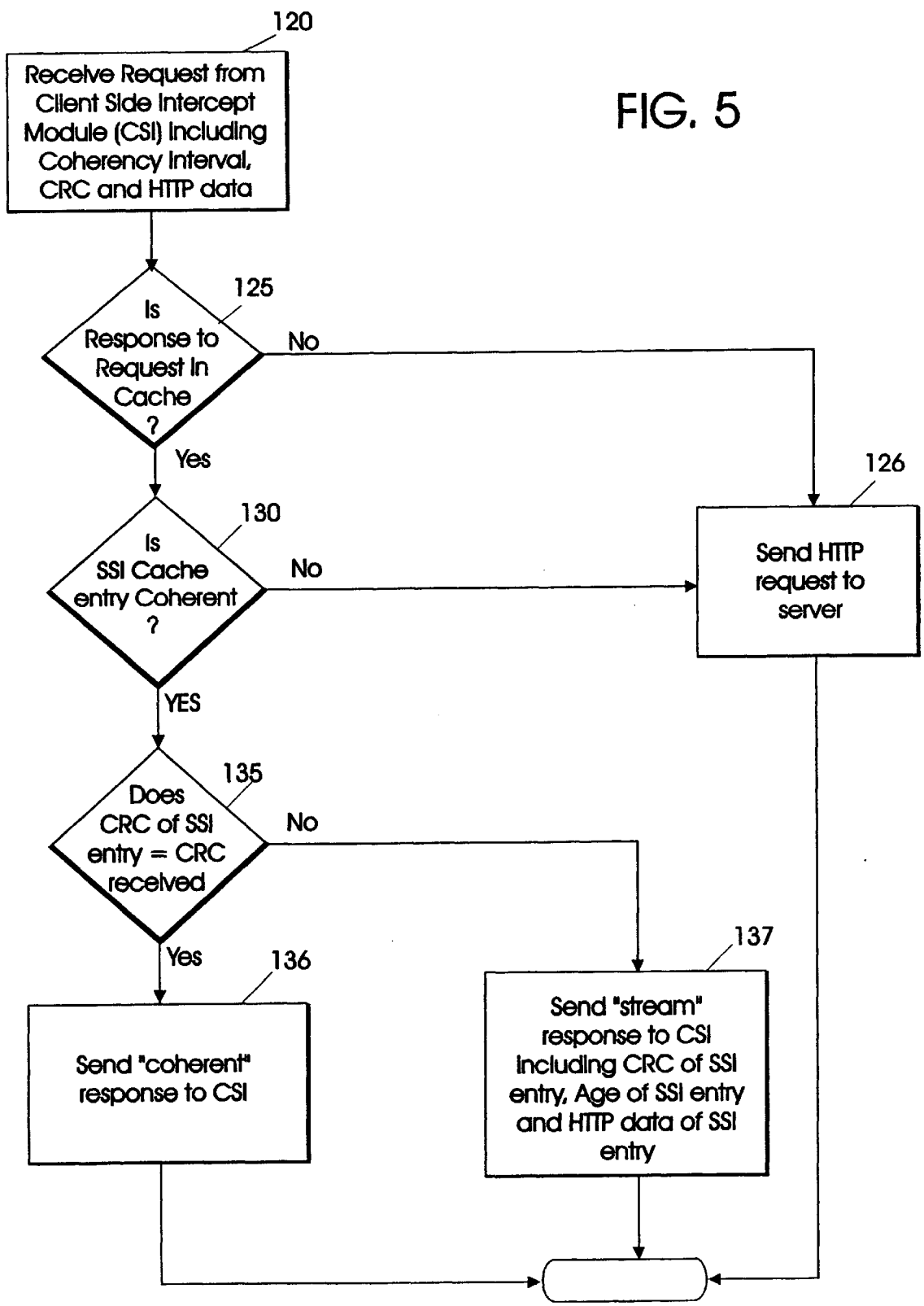
FIG. 5 is a flow diagram depicting operations carried out by a server-side intercept module in a preferred embodiment of the present invention implementing a coherent caching system.

Turning now to FIG. 5 which reflects the server-side intercept module operations in response to information received over the external communication link 35 from the client-side intercept module 30. When the server-side intercept module 40 receives a request from the client-side intercept module, the server-side intercept module 40 receives the predetermined client coherency time interval, the CRC value for the client cache entry, and the HTTP request originated by the web browser. The receipt of this information is reflected in block 120 of FIG. 5.

After receiving the information from the client-side intercept module 30, the server-side intercept module 40 checks its server cache resident in the second computer to determine if a server cache entry exists corresponding to the URL of the HTTP request originated by the web browser. If, after interrogating the web browser originated communication as reflected in block 125, the server-side intercept module 40 determines that a cache entry does exist corresponding to the information requested by the web browser originated communication the "Yes" branch of block 125 is taken. The server-side intercept module 40 then compares the current date and time of the SSI module 40 to the sum of the SDT of the server cache entry corresponding to the information requested by the web browser originated communication and the predetermined client coherency time interval received from the client-side intercept module.

If the current date and time is less than the sum of the SDT for the server cache entry and the coherency interval, then the "Yes" path of block 130 of FIG. 5 is taken. The server-side intercept module 40 then compares the CRC of the server cache entry to the CRC of the client cache entry to determine if the two cache entries are identical. If the two cache entries are identical, then the "Yes" path of block 135 is taken and, as reflected in block 136, a "coherent" response is sent to the client-side intercept module 30.

If the conditional of block 135 determines that the CRC's are not equal, then the information contained in the client cache and the server cache are not identical and, as reflected in block 137, the server-side intercept module sends the server cache entry to the first computer over the external communication link. In sending the server cache entry to the client-side intercept module 30, the server-side intercept module converts the entry to a client specific communication protocol which includes the CRC of the server cache entry, the server cache entry data, and the age of the server cache entry. The age of the server cache entry is calculated by subtracting from the current date and time the SDT of the cache entry.

Finally, with respect to FIG. 5, if either the sum of the SDT plus the predetermined client coherency time interval is less than the current date and time or if no cache entry exists corresponding to the URL of the web browser originated communication, then the "No" path of block 130 or the "No" path of block 125, respectively, will be taken. Thus, the operations of block 126 will be carried out and the server-side intercept module 40 will send to the server the web browser originated communication as an HTTP data stream. If the server-side intercept module 40 must send the web browser originated communication to the server as an HTTP data stream, then the server-side intercept module 40 will execute the operations of FIG. 6.

Figure 6:
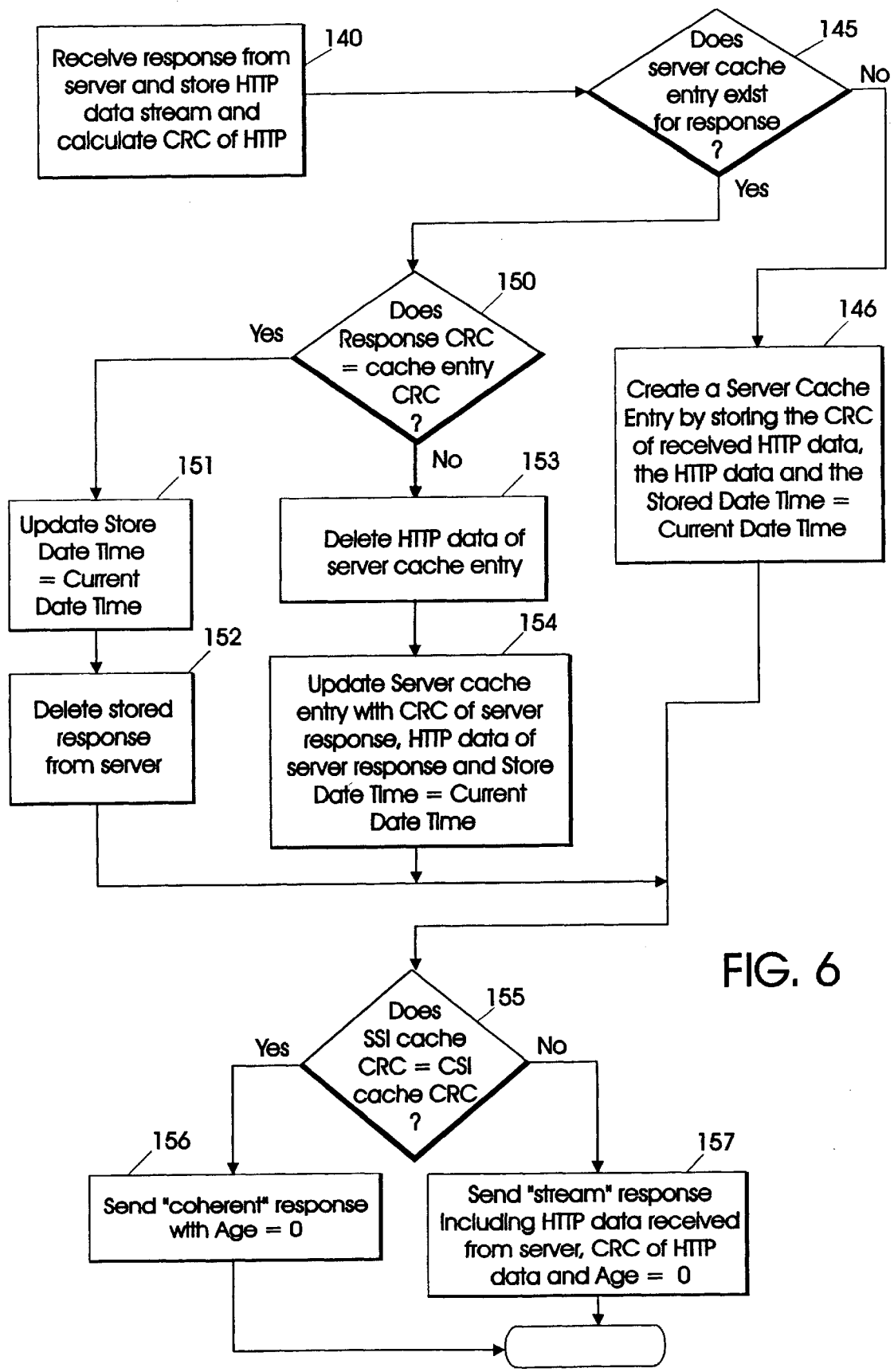
FIG. 6 is a flow diagram depicting operations carried out by a server-side intercept module in a preferred embodiment of the present invention implementing a coherent caching system.

As seen in FIG. 6 block 140, in response to the web browser originated communication, the server-side intercept module will receive an HTTP data stream from the web server 20. Upon receipt of the HTTP data stream, the server-side intercept module 40 will calculate the CRC for the HTTP data stream and temporarily store the HTTP data stream. Then, as reflected in block 145, the server-side intercept module interrogates the HTTP data stream and determines if a server cache entry corresponding the URL of the HTTP data stream exists. If such an entry does exist, then the "Yes" path of block 145 is carried out. The server-side intercept module 40 then compares the recently calculated CRC of the HTTP data stream received from the web server 20 with the CRC of the server cache entry corresponding to the URL of the web server originated response communication as reflected in block 150. If the CRC's are the same, then the "Yes" branch of block 150 is carried out. The server-side intercept module 40 updates the SDT entry for the server cache entry as reflected in block 151 and empties from temporary storage the HTTP data stream received by the web server 20 as shown in block 152.

If the results of the CRC comparisons indicate that the server cache entry is different than the HTTP data stream received from the web server 20, then the "No" path of block 150 is carried out. The server-side intercept module 40 removes from the server cache the existing data as reflected in block 153 and then, as reflected in block 154, updates the server cache with the newer information. As seen in block 154, this update includes storing in the server cache the CRC of the web server communication storing as part of the cache entry the current date and time as the SDT for the cache entry and storing the HTTP data stream. In either case, whether a server cache entry is updated or whether the server cache entry is found to be identical to the HTTP data stream received from the web server 20, the server-side intercept module then determines if the server cache entry is identical to the client cache entry corresponding to the web browser originating communication. This operation is reflected in block 155.

If the server-side intercept module 40 determines that a cache entry does not exist corresponding to the response received from the web server 20, then the "No" path of block 145 is taken. A server cache entry is created as reflected in block 146 by storing the URL of the response from the web server, by storing the CRC of the response from the web server, by storing the HTTP data stream, and by storing as the SDT the current date and time. After creating a cache entry corresponding to the web browser originated communication, the server-side intercept module 40 then again compares the CRC of this server cache entry to the CRC of the corresponding client cache entry as reflected in block 155.

If the results of the comparison of the server cache entry to the client cache entry indicate that the cache entries are identical, then the "Yes" branch of block 155 is taken and the operations of block 156 are carried out. In block 156 it is seen that the server-side intercept module 40 sends a coherent response to the client-side intercept module 30. The server-side intercept module 40 transforms the server request cache entry to a client/server specific data stream by sending the coherent response and sending an age of zero to the client-side intercept module.

If the server-side intercept module 40 determines that the client cache entry is not identical to the server cache entry corresponding to the web browser originated communication, then the "No" branch of block 155 is taken and the operations of block 157 are carried out. As reflected in block 157, the server-side intercept module 40 converts or transforms the server cache entry into a client/server specific data stream. The data stream includes the CRC of the server cache entry, the server cache entry HTTP data stream, and the age of the cache entry which is set to zero. This client/server specific communication is then transmitted over the external communication link 35 to the client-side intercept module 30.

The functions of the client-side intercept module 30 upon receipt of a communication from the server-side intercept module will now be described with respect to FIG. 4. As seen in block 160, the client-side intercept module 30 receives or acquires the client/server specific data stream which was transmitted over the external communication link 35. The client-side intercept module then determines what type of response was received from the server-side intercept module 40 as reflected in block 165. If the server-side intercept module 40 indicates that the client cache entry is coherent, i.e. the server cache entry and the client cache entry are identical, then the operations reflected in block 166 are carried out. As seen in block 166, the client-side intercept module 30 updates the SDT of the client cache entry corresponding to the web browser originated communication with the difference between the current date and time and the age received from the server-side intercept module 40. Thus, without synchronizing the two clocks of the first computer 5 and the second computer 6, the present invention has revised the coherency time of the cache entry of the first computer to reflect the newer data of the second computer.

After updating the SDT for the client cache entry corresponding to the web browser originated communication, the client-side intercept module 30 transfers the client cache entry to the web browser 10 as an HTTP data stream. This operation is shown in block 174.

If, however, the client-side intercept module 30 determines that the response type is a data or data stream response, then the "stream" path out of block 165 is taken and the operations of block 167 are carried out. The client-side intercept module 30 receives the HTTP data stream and temporarily stores this data. Then, as reflected in block 170 of FIG. 4, the client-side intercept module 30 determines if a cache entry exists corresponding to the web browser originated communication. If a cache entry exists, then the "Yes" path of block 170 is taken and, as reflected in block 171, the existing cache entry is flushed. The client-side intercept module then updates the client cache entry corresponding to the web browser originated communication by storing the CRC of the HTTP data stream received from the server-side intercept module 40, by storing as the SDT the difference between the current date and time and the age received from the server-side intercept module 40, and by storing the HTTP data stream. This operation is reflected in block 172.

If no cache entry exists corresponding to the web browser originated communication, then the "No" path of block 170 is taken. A client cache entry is created by carrying out the operations reflected in block 173. As seen in block 173, the client-side intercept module 30 creates a client cache entry by storing the URL of the HTTP data stream received from the server-side intercept module 40 by storing the CRC of the HTTP data stream received from the server-side intercept module 40 and by storing the HTTP data stream. The client-side intercept module 30 also updates the SDT or stores the SDT by subtracting from the current date and time the age received over the external communication link 35 from the server-side intercept module 40.

However, a client cache entry is created whether through the operations of blocks 166, 172, or 173, the client-side intercept module transfers or provides the client cache entry to the web browser 10 as an HTTP data stream. These operations are reflected in block 174 of FIG. 4.

As will be appreciated by one of skill in the art, the client cache and the server cache may be implemented with memory or with mass storage such as hard disks, read/write CD-ROMS, optical disks, or other storage technologies. Furthermore, as will be appreciated by one of skill in the art, the client-side intercept module and the server-side intercept module may be implemented through software, hardware, or a combination thereof.

While references made to caches being resident in a particular first or second computer, as will be appreciated by one of skill in the art, the benefits of the present invention may be achieved even though the cache is not resident in the first computer but is simply on the same side of the external communication link as the computer. Thus, a hardware cache could be implemented external to the first computer that serves as a client cache and connected to the first computer by high speed communications and yet, as long as the cache is on the same side of the external communication link as the first computer, the benefits of the present invention will be achieved.

In an alternative embodiment of the present invention, the server-side intercept module 40 does not maintain a copy of the HTTP data stream received from the web server 20 but simply maintains a directory entry for the communication.

The directory entry would include the URL of the communication, the CRC calculated for the HTTP data stream and the time when the HTTP data stream was received from the web server and the SDT for the communication which may be set to the time when the CRC was calculated. In such a case when the client-side intercept module 30 sends a request to the server-side intercept module 40 for a communication which corresponds to a URL for which the server-side intercept module has maintained a CRC and SDT, then the server-side intercept module checks the CRC received from the client-side intercept module 30 to determine if it corresponds to the CRC of the latest HTTP data stream for the specified URL. If there is a match, then a coherent response is sent to the client-side intercept module. If there is not a match, then the server-side intercept module sends the HTTP data stream received from the client-side intercept module to the web server 20 and returns to the client-side intercept module 30 the response received from the web server 20.

Figure 7:
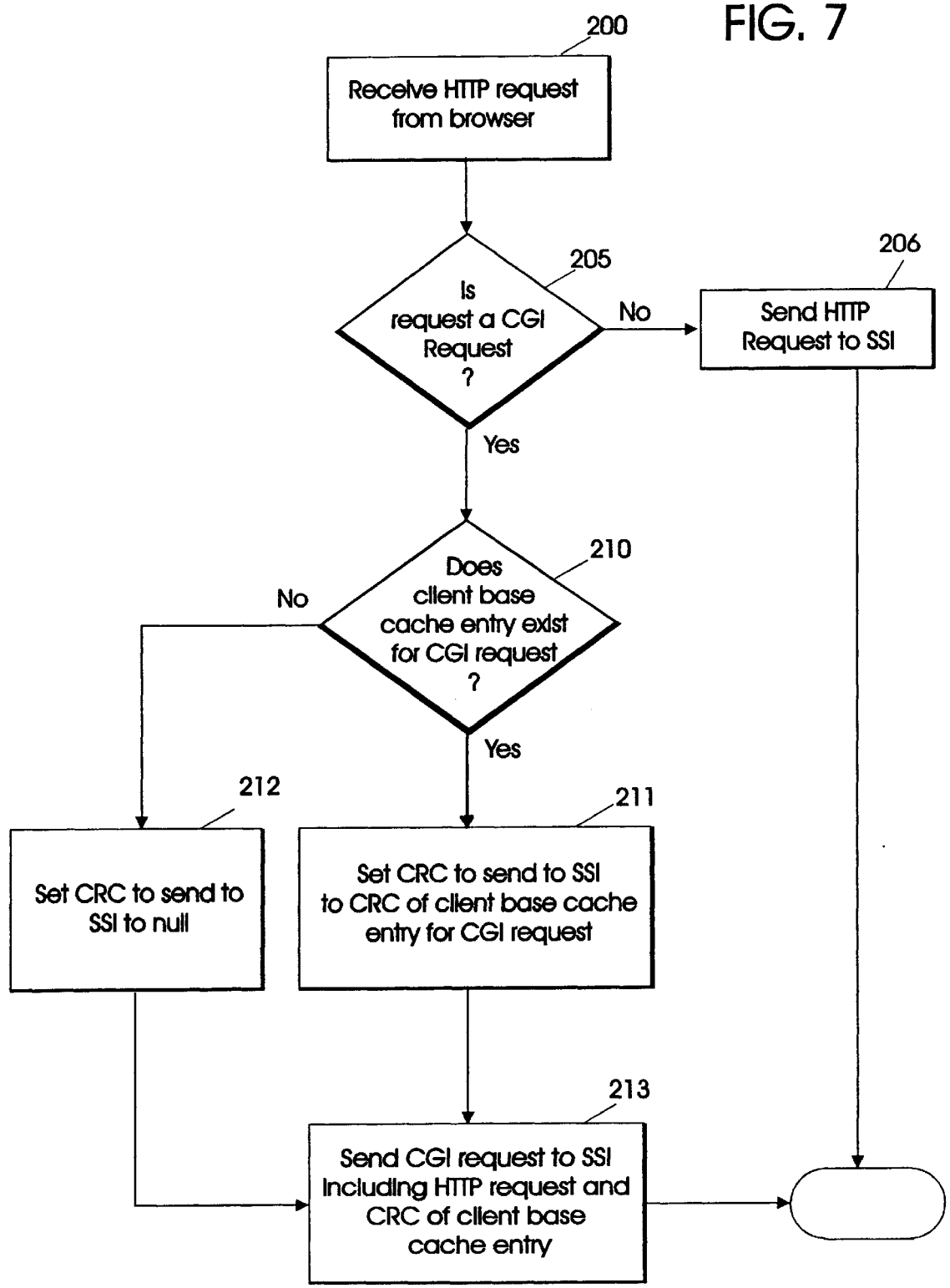
FIG. 7 is a flow diagram depicting operations carried out by a client-side intercept module in a preferred embodiment of the present invention implementing a differencing data transfer system.

FIG. 7, 8, 9, and 10 reflect the operations carried out by the client-side intercept module 30 and the server-side intercept module 40 in another aspect of the present invention which utilizes differencing to reduce the data transferred over the external communication link 35. As seen in FIG. 7, block 200 illustrates the receipt by the client-side intercept module 30 of an HTTP request from the web browser 10. As reflected in block 205, the client-side intercept module 30 interrogates the intercepted HTTP request from the web browser 10 to determine if the request is to a common gateway interface (CGI). If the request is not to a common gateway interface, then the client-side intercept module 30 passes the request to the server-side intercept module as reflected in FIGS. 3 through 6 and is illustrated by block 206 of FIG. 7.

If, however, the web browser originated communication corresponds to a CGI request, then the "Yes" path out of block 205 is taken. As reflected in block 210, the client/server intercept module 30 determines if a client base cache entry exists corresponding to the HTTP data stream which was previously to be provided to the web browser in response to a corresponding CGI request. This interrogation of the CGI request may be accomplished by comparing the URL of the web browser originated communication to the URLs stored in the client base cache.

The client base cache may be initialized by storing the first HTTP data stream received by the client-side intercept module 30 which is to be provided to the web browser 10 for a given URL. This base cache entry may be maintained over numerous instances or sessions of the web browser 10. The client base cache entries may be updated as reflected in FIGS. 7, 8, 9, and 10. If a client base cache entry exists corresponding to the URL for the web browser originated communication, then the CRC to be sent to the server-side intercept module 40 over the external communication link 35 is set equal to the CRC for the client base cache entry as reflected in block 211 of FIG. 7. If no client base cache entry exists, then the "No" path out of block 210 of FIG. 7 is taken and the CRC for the request to be sent over the external communication link 35 to the server-side intercept module 40 is nulled. This operation is reflected in block 212 of FIG. 7.

Block 213 illustrates the operations of sending the CGI request to the server-side intercept module 40 over the external communication link. As reflected in block 213, the client-side intercept module 30 transmits the HTTP request and the request CRC which has either been set to null if no client base cache entry exists for the URL of the CGI request or has been set to the CRC of the client base cache entry if an entry does exist. Thus, the client-side intercept module has converted the CGI request to a client/server specific protocol, transmitted the client/server specific communication over the external communication link to be received by the server-side intercept module 40.

The actions taken by the server-side intercept module when a CGI request is received are reflected in FIG. 9. The receipt of the CGI request by the server-side intercept module 40 is shown in block 220. When the server-side intercept module 40 receives the CGI request, it saves a copy of the CRC value and the HTTP request. As seen in block 221, the server-side intercept module 40 passes the HTTP request to the web server 20.

Figure 10B:
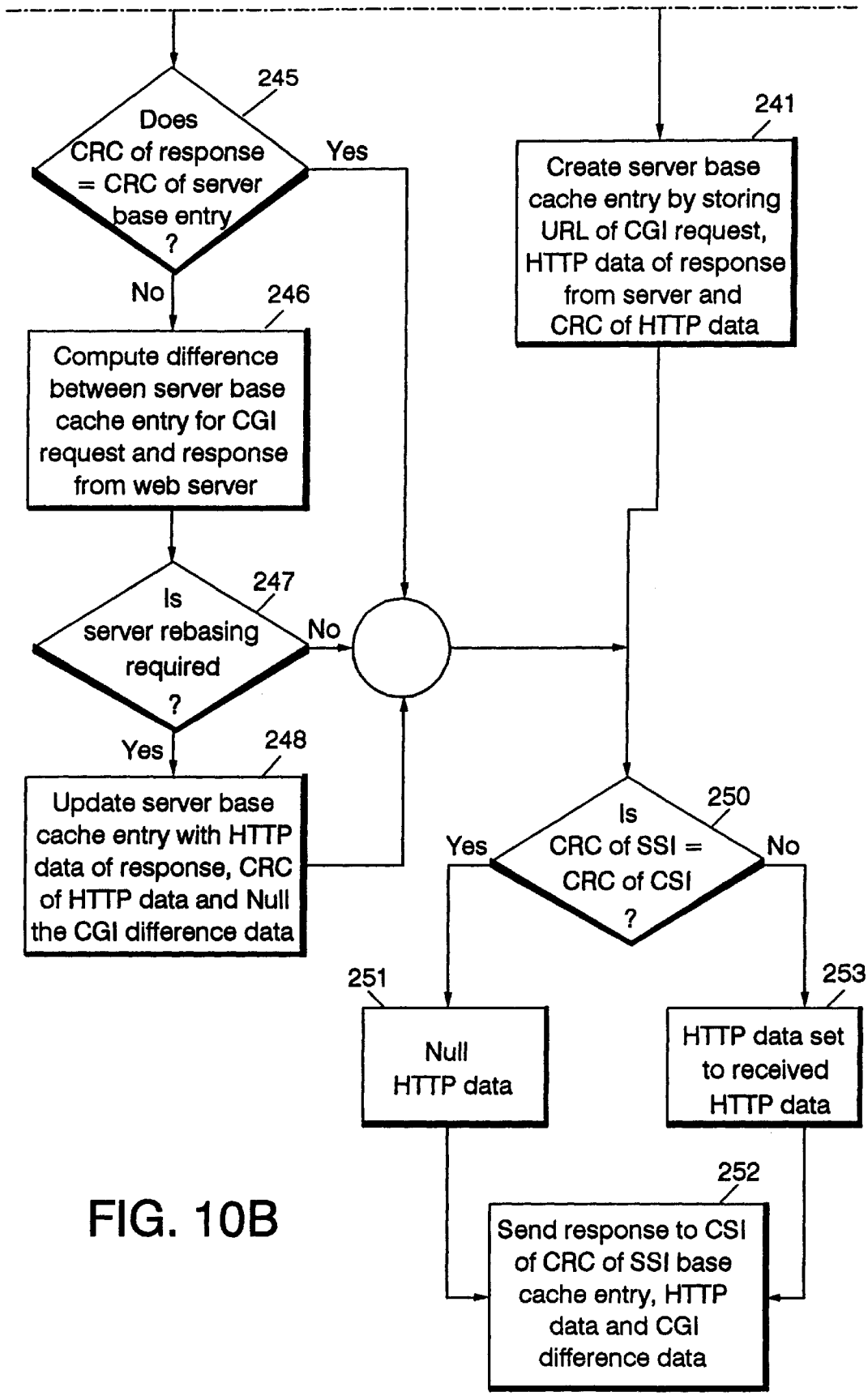
FIG. 10 (which is comprised of FIG. 10A and FIG. 10B which collectively form FIG. 10) is a flow diagram depicting operations carried out by a server-side intercept module in a preferred embodiment of the present invention implementing a differencing data transfer system.

When the server-side intercept module 40 receives a response to the HTTP request corresponding to the web browser originated communication or CGI request, the server-side intercept module 40 receives this response as an HTTP data stream as reflected in block 230 of FIG. 10. As seen in block 230, the server-side intercept module 40 saves the HTTP data stream and computes a CRC value for the HTTP data stream received from the web server 20. The server-side intercept module 40 also nulls the difference value to initialize the difference data. The server-side intercept module then determines if the response received as a web server originated communication is a response to a CGI request as shown in block 235. If the answer is no, then the "No" path out of block 235 of FIG. 10 is taken and the operations of block 236 are executed to send the HTTP data stream to the client-side intercept module. As reflected in block 236, this operation may involve the caching operations described in FIGS. 3 through 6. If the response received in block 230 is a response to a CGI request, then the "Yes" path out of block 235 is taken and the server-side intercept module then determines if a server base cache entry exists for the CGI response as reflected in block 240.

A server base cache entry may be created the first time the server-side intercept module 40 receives a response to a CGI request. In this instance the result of the conditional reflected in block 240 will cause the "No" path to be taken out of block 240. The server-side intercept module 40 will then create a server base cache entry corresponding to the CGI request by storing the URL for the CGI, the HTTP data stream for the response to the CGI request, and the CRC for the HTTP data stream. This operation is reflected in block 241. To be compatible with the coherent cache system described in FIGS. 3 through 6, the server base cache entry may also include the SDT. As used herein, the term server CGI base form refers to the server base cache entry corresponding to the CGI request received from the web browser 10.

If a server base cache entry exists corresponding to the CGI request then the "Yes" path out of block 240 is taken. The server-side intercept module compares the CRC of the server base cache entry to the CRC of the response received from the web server 20. These operations are reflected in block 245 of FIG. 10. If the CRCs are the same, then the server-side intercept module determines if the CRC for the server base cache entry corresponds to the CRC for the client base cache entry. If these two CRC values are the same, then the client base cache entry, the server base cache entry, and the response received from the web server 20 all contain the same HTTP data stream. The comparison of the server base cache entry to the client base cache entry is reflected in block 250.

If the two base cache entries are the same, then the server-side intercept module need not send the base cache entry to the client-side intercept module 30 and so, as reflected in block 251, the HTTP data stream data to be transferred to the client-side intercept module 30 is nulled. The server-side intercept module 40 then converts the HTTP data stream received from the web server 20 to a client/server specific communication protocol by transmitting the CRC of the HTTP data stream stored in the server base cache corresponding to the CGI request, the nulled HTTP data stream data and the nulled difference data to indicate that the response to the CGI request was identical to the client base cache entry, as illustrated in block 252.

Returning to block 245, if the CRC for the server base cache entry corresponding to the CGI request is different than the CRC for the response received from the web server in response to the CGI request originated by the web browser, then the "No" path out of block 245 is taken. The server-side intercept module 40 then carries out the operations reflected in block 246. The server-side intercept module 40 compares the intercepted CGI response to the server base cache entry corresponding to the intercepted CGI request or the server CGI base form. This comparison of the intercepted CGI response to the server CGI base form provides CGI difference data which corresponds to the difference between the intercepted CGI response and the server CGI base form.

The differencing may be performed by any method known to those of skill in the art for determining the difference between a base form and a modified form. One method of differencing suitable for use in the present invention is described in "a Cross-Platform Binary Diff" by Coppieters, Dr. Dobb's Journal, May 1995, pp. 32–36, the disclosure of which is incorporated herein by reference as if set forth fully. Other methods which may be used in determining the difference data include those described in IBM Technical Disclosure Bulletin, Vol. 22, No. 8A, January 1980 which is also incorporated herein by reference as if set forth fully.

The server-side intercept module 40 then determines if the server CGI base form requires updating as reflected in block 247. This determination may be made by determining if the average difference data between the intercepted CGI response and the server CGI base form is over a predefined threshold. Other methods of determining if the server base cache entry corresponding to the CGI request should be updated may include time coherency such as that described in FIGS. 3 through 6 or other methods known to those with skill in the art to determine if the difference data has increased to such an extent that rebasing to create a new base cache entry would improve system performance.

If rebasing of the server is not required, then the "No" path out of block 247 is taken and the server-side intercept module 40 carries out the operations of block 250 to determine if the CRC of the client base cache entry is the same as that of the server base cache entry or the server CGI base form is identical to a client CGI base form which are the base cache entries of the server and the client which correspond to the particular CGI request of the web browser originated communication. If the base forms are the same, then the client does not need to be rebased and the HTTP data stream information is nulled, as reflected in block 251. The server-side intercept module 40 then sends the difference response to the client-side intercept module 30 by sending the CRC of the server base cache entry corresponding to the CGI request (i.e. the CRC of the server CGI base form), by sending the nulled HTTP data stream which would correspond to the base data and by sending the difference data determined in block 246. These operations are again reflected as block 252 of FIG. 10.

If the server-side intercept module 40 determines that the CRCs are not the same for the client CGI base form and the server CGI base form, then the client needs to be rebased. The client rebasing operation consists of sending the server CGI base form to the client-side intercept module 30. To perform this operation, the server-side intercept module sets the HTTP data stream data to be sent to the client-side intercept module 30 equal to the server CGI base form. This operation is reflected in block 253. The server-side intercept module 40 then converts the HTTP data stream received from the web server to a client/server specific protocol by sending the CRC of the server CGI base form, the HTTP data stream data corresponding to the server CGI base form, and sending the difference data between the CGI base form and the response received from the web server as seen in block 252. This information is then transmitted over the external communication link 35 to the client-side intercept module 30.

Returning to block 247, if server rebasing is required then the "yes" path out of block 247 is taken. As reflected in block 248 the server side intercept module updates the server base cache entry corresponding to the browser originated communication with the HTTP data stream received from the web server. The CRC of the response is also updated and the CGI difference data is nulled. The server side intercept module then compares the CRC of the new server side cache entry as reflected in block 250 and completes the transfer as described above.

Figure 8:
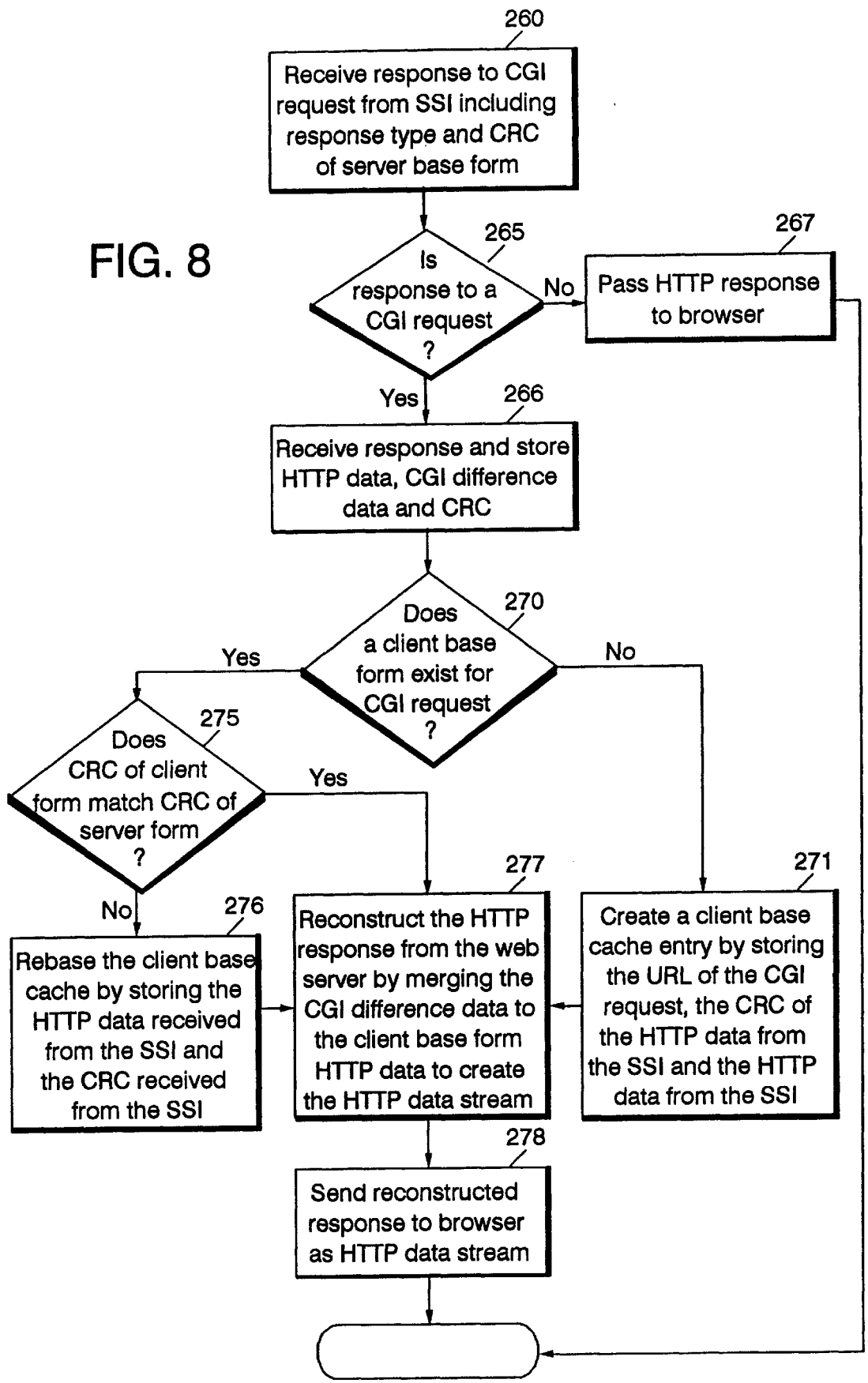
FIG. 8 is a flow diagram depicting operations carried out by a client-side intercept module in a preferred embodiment of the present invention implementing a differencing data transfer system.

The operations of the client-side intercept module upon receipt of a response from the server-side intercept module 40 are shown in FIG. 8. The receipt of the response from the server-side intercept module 40 by the client-side intercept module 30 is reflected in block 260. As seen in block 265, the client-side intercept module 30 determines if the response is a response to a CGI request. If the response is not to a CGI request, then the client-side intercept module carries out the operations of block 267 which may include the cache operations reflected in FIGS. 3 through 6. If, however, the response is to a CGI request, then the "Yes" path out of block 265 is taken. The client-side intercept module 30 saves the HTTP data stream data, the difference data, and the CRC acquired from the client/server specific data stream transmitted over the external communication link. These operations are reflected in block 266 of FIG. 8.

The client-side intercept module 30 then determines if a client base cache entry corresponding to the intercepted CGI request exists which would contain a client CGI base form. This interrogation is shown in block 270 and may be carried out by examining the URL of the HTTP request or HTTP response. If a client CGI base form exists, then the "Yes" path out of block 270 is taken. The client-side intercept module 30 then compares the CRC received over the external communication link to that of the CRC of the client CGI base form as shown in block 275. If they are different, then the "No" path of block 275 is taken and the client rebases by updating the CGI base form by replacing the client base cache entry corresponding to the URL of the CGI request of the web browser originated communication with the HTTP data stream data received over the external communication link 35 from the server side intercept module 40. The client base cache entry also is updated with respect to the CRC for the HTTP data stream. These operations are reflected in block 276 of FIG. 8.

If the CRC received over the external communication link 35 is the same as the CRC of the CGI base form, then the server-side intercept module server CGI base form is the same as the client-side intercept module client CGI base form and the "Yes" path out of block 275 is taken.

Whether the base forms are the same or the client is rebased, the operations reflected in block 277 are carried out by the client-side intercept module 30. Block 277 reflects the client-side intercept module 30 reconstructing the HTTP data stream corresponding to the communication from the web server 20 from the client/server specific data stream received over the external communication link 35 by combining the client CGI base form with the CGI difference data received over the external communication link 35 to create an HTTP data stream corresponding to the intercepted CGI response. As seen in block 278, this response is then provided to the web browser 10 as an HTTP data stream.

If no CGI base form exists in the client corresponding to the URL of the CGI request, then the "No" path out of block 270 of FIG. 8 is taken. As seen in block 271, the client-side intercept module 30 creates a client base cache entry corresponding to the URL of the CGI request by storing the URL, the CRC of the HTTP data stream received over the external communication link from the server-side intercept module 40, and the actual HTTP data stream data. Storing this information creates a client base cache entry corresponding to the intercepted CGI request and thus creates a client CGI base form. The client-side intercept module may then carry out the operations of block 277 by reconstructing the HTTP data stream by combining or merging the client CGI base form with the CGI difference data which may have been nulled.

The present differencing techniques may also be applied to non-CGI data. In such an instance, the server-side intercept module 40 would need to keep multiple generations of server base cache entries to allow for the possibility that client-side intercept modules of web browsers connected to the web server may have different base forms. The server-side intercept module could then compare the CRC received from the client-side intercept module with the CRC of each of the prior generations of server base forms until a match was obtained. The server-side intercept module 40 may then optionally rebase the client-side intercept module 30 or simply provide the difference data to the client-side intercept module 30. Thus, the differencing methodologies described herein with respect to the CGI request may apply equally to any HTTP request and response.

While the above system of maintaining multiple generations of base forms may allow for the use of differencing with non-CGI requests, this methodology is more memory or storage intense and does not fully exploit the caching capabilities described above. To reduce memory or storage requirements and exploit the caching methods described above, the following preferred method of using differencing for non-CGI requests may be utilized. In this preferred implementation the server side intercept module calculates the difference between the a server base form corresponding to the request and the HTTP data stream of the response from the web server. This difference data is then stored by the server side intercept module. The server base form is then updated by replacing the base form with the new response from the web server, including updating the CRC of the base form. However, rather than discarding the old CRC, the CRC's for previous base forms are stored as is the difference data. The prior generations of difference data and CRCs are then selectively transmitted to the client side intercept module based upon the CRC of the client base form corresponding to the non-CGI request.

As an example of the non-CGI differencing method, if the server side intercept module receives a non-CGI request this request would also be accompanied by the CRC of the base form resident in the client side intercept module corresponding to the URL of the non-CGI request. When the server side intercept module received the response from the web server it would calculate the CRC of the response. The server side intercept module would then calculate the difference between the response and the server base form for the URL and save this difference data. The server side intercept module would update the server base form with the response data and archive the CRC of the previous base form and the difference data between the response and the old base form. The server side intercept module would then compare the CRC of the client base form with the server base form CRC and any stored or archived CRCs to determine if a match is found. If no match is found the response is simply sent to the client side intercept module.

If a match is found then the difference data corresponding to the CRC match and any subsequent difference data up to and including the current difference data is sent to the client side intercept module. The client side intercept module then applies the difference data to the client base form to reconstruct the response. Thus, if the CRC match occurred with a CRC for a base form which was three generations old then three sets of difference data would be sent to the client side intercept module and the construction of the response would be accomplished by applying three successive difference data sets to the client base form. If however, the number of difference data sets or the sizes of the difference data sets required to reconstruct the response is so great that sending the actual response would require less data transfer then the response itself may be sent by the server side intercept module. In any event, after reconstructing or receiving the response the client side intercept module would update the client base form for the URL of the request with the response data and update the CRC with the CRC for the response. Because the client base form is updated each time a response is received for a particular URL, the client cache described above may be utilized as the cache for the client base form, thereby eliminating the need for a separate cache of the client base forms if differencing is utilized on non-CGI requests.

In a further aspect of the present invention, additional communication savings may be achieved based upon the redundancy of a stateless communication protocol such as HTTP. In such a protocol, the client transmits information about itself to the server each time a communication is initiated. Likewise, the server communicates specific information about itself to the client each time a response is initiated.

In one alternative embodiment of the present invention, the first computer 5 communicates to the second computer 6 the computer specific information corresponding to the predefined characteristics of the first computer. The second computer stores this computer specific information. The first computer then removes the computer specific information from subsequent web browser originated communications prior to transmission on the external communication link 35. The second computer 6 then rebuilds the original web browser originated communication by combining the stored computer specific information with the subsequent communication received over the external communication link 35 to create an HTTP data stream.

In addition to removing the computer specific information from communications originated by the web browser, this computer specific information may also be removed from communications originated by the web server. In such a case, the second computer 6 of FIG. 2 provides to the first computer 5 over the external communication link 35 the computer specific information corresponding to the predefined characteristics of the second computer 6. The first computer 5 stores the computer specific information to provide server header information. On subsequent communications, the second computer 6 removes the computer specific information from the web server originated communication and transmits the remaining portion of the web server originated communication on the external communication link 35. The first computer 5 receives the communication over the external communication link and rebuilds the original web server originated communication by combining the server header information with the client/server specific data stream received over the external communication link to create an HTTP data stream. In both instances, the operations of removing the computer specific information and storing the information to create either server header information or client header information are carried out by the client-side intercept module 30 or the server-side intercept module 40, depending upon whether the operation takes place in the first computer 5 or the second computer 6.

In one embodiment of the present invention, the web browser 10 communicates to the client-side intercept module 30 using the Transmission Control Protocol/Internet Protocol (TCP/IP). TCP may also be used for a communication between the client-side intercept module 30 and the server-side intercept module 40 over the external communication link 35. Finally, TCP may be used for communication between the server-side intercept module 40 and the web server 20. While TCP may be used for communications between the various components that make up the system of the present invention, the HTTP protocol does not provide the most efficient means for communication over an external communication link. To increase the performance of the external communication link 35, one embodiment of the present invention creates what are referred to herein as "virtual sockets" which are utilized in the connection between the web browser and the client-side intercept module 30 and between the server-side intercept module 40 and the web server 20. The operation of these virtual sockets will now be described with reference to FIGS. 11 through 17.

FIG. 11 is a block diagram of one possible implementation of the present invention utilizing the concept of virtual sockets. As seen in FIG. 11, the first computer 5 and the second computer 6 are connected over the external communication link 35. The web browser 10 has a plurality of real sockets which connect the web browser 10 to the client-side intercept module 30. As seen in FIG. 11, the first real socket is depicted as 65a on the web browser 10 and the corresponding socket is 65b on the client-side intercept module 30. This first real socket is the TCP socket over which the web browser 10 requests further connections from the client-side intercept module 30.

When the web browser 10 requests a new TCP connection, a communication occurs over the real socket 65a which is received at the real socket 65b. The client-side intercept module 30 will then create another real socket for communication with the web browser 10. As seen in FIG. 11, a plurality of real sockets are created on the web browser 10 with a corresponding real socket being created on the client-side intercept module 30. These real sockets are depicted as 60a through 64a on the web browser 10 and 60b through 64b on the client-side intercept module 30. These real sockets are the means through which the web browser 10 communicates with the client-side intercept module 30. After creating the real sockets 60a through 64a and 60b through 64b, communications over these sockets are multiplexed onto a real socket 36a which provides access for the client-side intercept module 30 to the external communication link 35. Real sockets 36a and 36b are created when a request is sent over real socket 37a of computer 5 to real socket 37b of computer 6. Upon receipt of the connection request by real socket 37b, real sockets 36a and 36b are created. Sockets 37a and 37b act as the first real sockets for communication between the client side intercept module and the server side intercept module and may only be utilized for establishing the connection between the two modules reflected by sockets 36a and 36b. Each of these real sockets operates under standard TCP/IP protocols. When communications are received by the second computer 6 over the external communication link 35, they are received at real socket 36b. The server-side intercept module 40 then demultiplexes the communications received at socket 36b and provides them to the appropriate socket for transmission to the web server 20. Thus, for example, a communication over socket 60a to socket 60b for a request of information from a specific URL would be multiplexed onto socket 36a, received by socket 36b, demultiplexed by the server-side intercept module 40, and transmitted from socket 60c to socket 60d on the web server 20. Likewise, communications occurring over socket 61a are received by socket 61b, multiplexed by the client-side intercept module 30, and transmitted from socket 36a to socket 36b where the server-side intercept module 40 demultiplexes the communication and transmits it over socket 61c to socket 61d. Thus, communications over socket 60a and 60b, 61a and 61b, 62a and 62b, 63a and 63b, and 64a and 64b are transmitted over the respective corresponding sockets between the server-side intercept module 40 and the web server 20 of socket 60c and socket 60d, socket 61c and 61d, socket 62c and socket 62d, socket 63c and socket 63d, and socket 64c and 64d.

In a similar manner, responses to requests from web browser 10 by the web server 20 are also transmitted over sockets connecting the web server 20 to the server-side intercept module 40 and over the external communication link 35 to the client-side intercept module 30, and then to the web browser 10. Thus, for example, a response originated by web server 20 could be sent over socket 60d to socket 60c and multiplexed by the server-side intercept module 40 onto socket 36b where it is transmitted over the external communication link 35 to socket 36a. The client-side intercept module 30 then demultiplexes the communication and provides it to socket 60b for transmission to socket 60a on the web browser 10. A similar communication path is established for each socket being utilized by the web browser 10 or the web server 20. As will be appreciated by one of skill in the art, while the present invention has been described with respect to 4 socket connections between the web browser 10 and the web server 20, any number of sockets may be opened for providing communication access between the web browser 10 and the web server 20.

Figure 12:
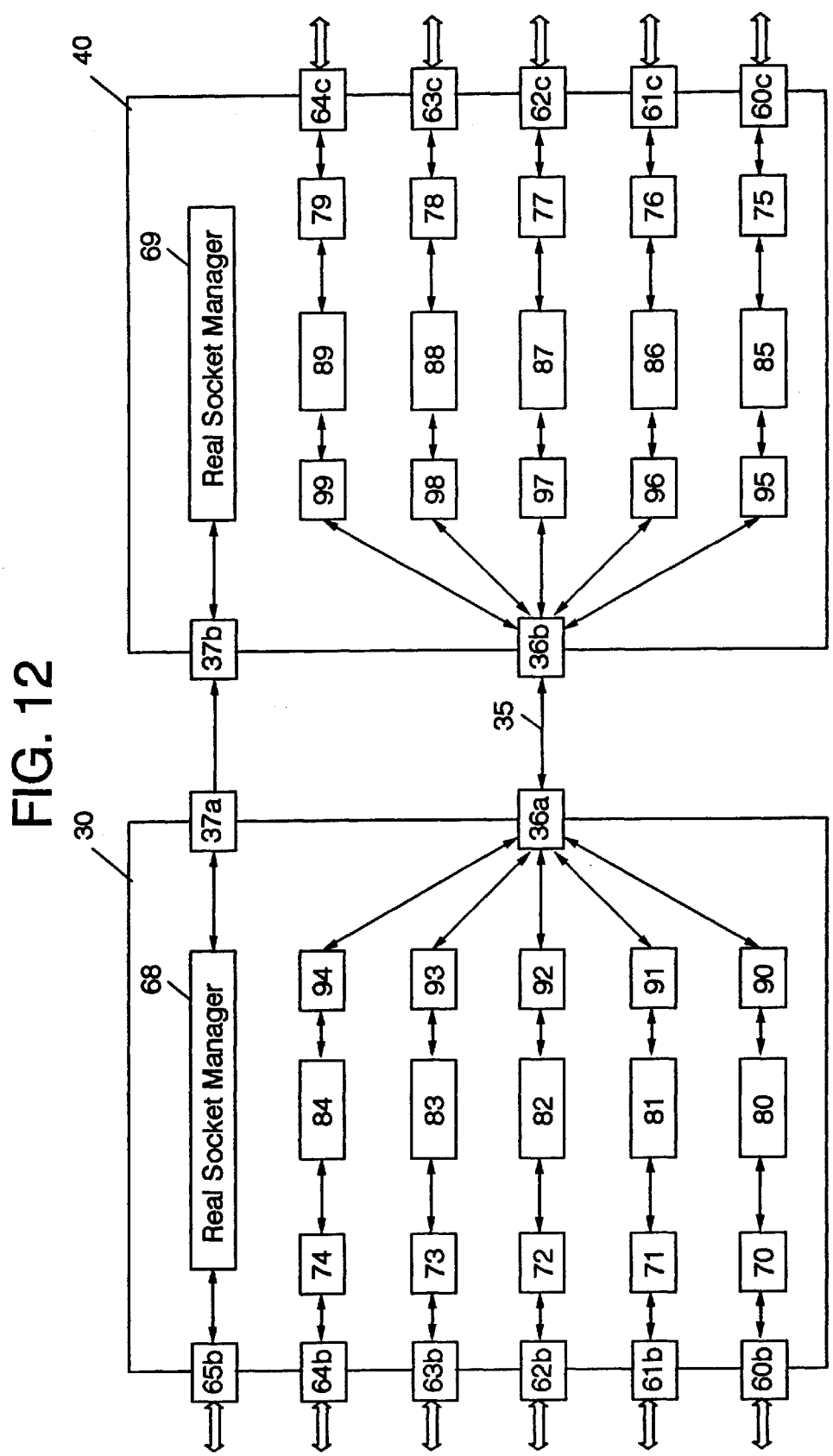
FIG. 12 is a block diagram of a client-side intercept module and a server-side intercept module according to one embodiment of the present invention utilizing virtual sockets.

FIG. 12 is a block diagram illustrating the implementation of the virtual socket system in the client-side intercept module 30 and the server-side intercept module 40. External to these modules the real sockets between the client-side intercept module 30 and the web browser 10 and the server-side intercept module 40 and the web server 20 function as normal TCP/IP sockets. Thus, the use of virtual sockets is transparent to the web browser 10 and the web server 20.

Figure 13B:
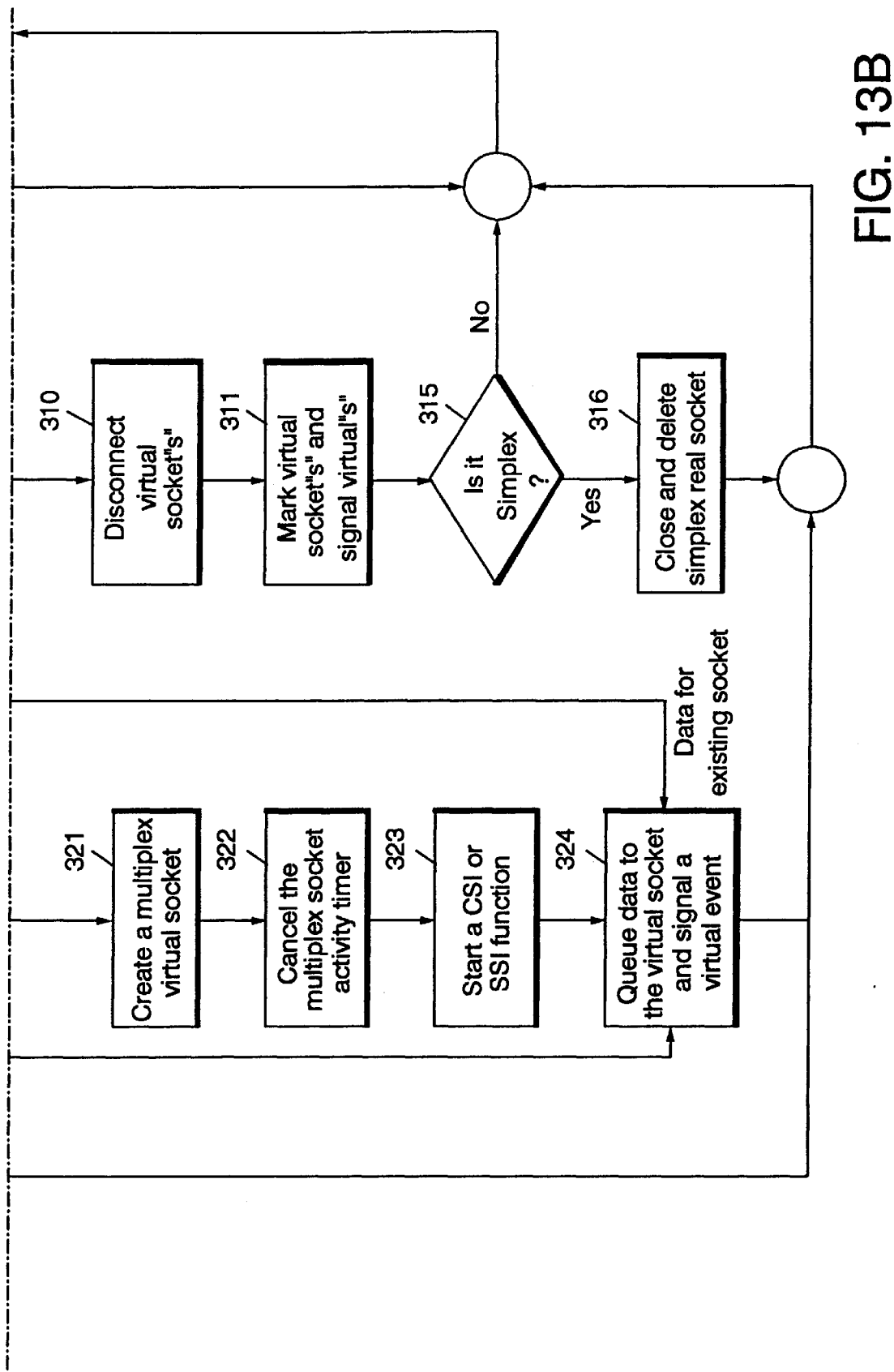
FIG. 13 (which is comprised of FIG. 13A and FIG. 13B which collectively form FIG. 13) is a flow diagram depicting operations carried out by a socket manager of either the client-side intercept module or the server-side intercept module according to one embodiment of the present invention utilizing virtual sockets.

A particular embodiment of the present invention will be described with respect to the block diagram FIG. 12 and the flow diagrams of FIGS. 13 through 17. FIG. 13 is a flow chart for the socket manager depicted as block 68 in FIG. 12. Referring to FIG. 13, block 300 reflects the creation of the real socket manager 68 of the client-side intercept module 30. After the real socket manager 68 is created, it creates a first real socket shown as socket 65b in FIG. 12. The creation of this first real socket is reflected as block 301 of FIG. 13. After creating the first real socket 65b, the socket manager 68, resident in the client-side intercept module 30, also referred to herein as the client socket manager, waits for an event on the first real socket 65b as is seen in block 302 of FIG. 13. When an event is received on the first real socket 65b, the real socket manager 68 examines the event and, based upon that examination, takes one of five paths as reflected in block 305 of FIG. 13.

If a real socket is created in response to a communication request received at the first real socket 65b, then, as reflected in the path from block 305 to block 306 of FIG. 13, the real socket manager 68 adds the real socket to the real event list. The real socket manager then creates a simplex virtual socket as indicated in block 307. In the case of the client-side intercept module, the real socket manager initiates an application function which carries out functions of the client-side intercept module for the virtual socket created as reflected in block 308 of FIG. 13.

As used herein, the term "simplex socket" or "simplex virtual socket" refers to a socket which connects directly to either a single socket or a single application. As used herein, "multiplex socket" refers to a socket which connects to a plurality of other sockets. Thus, the multiplex socket carries out a multiplexing or demultiplexing function and the simplex socket preforms a one-to-one connection. Thus, for example, in carrying out the functions of blocks 306 through 308 of FIG. 13, the client socket manager 68 would, in response to the first connection request received by the first real socket 65b, create real socket 60b, simplex virtual socket 70, and initiate the client-side intercept function in an application 80. Similarly for subsequent events where a real socket is created, the real socket manager would create real sockets 61b, 62b, 63b, or 64b and simplex virtual sockets 71, 72, 73, or 74, and initiate a CSI function corresponding to the created real and virtual sockets depicted as blocks 81, 82, 83, or 84 of FIG. 12.

The operation of the client-side intercept function will now be described with reference to the real socket 60b, the simplex virtual socket 70, and the client-side intercept function 80 reflected in FIG. 12. Block 325 of FIG. 14 reflects the creation of the client-side intercept function 80. Upon creation, the client-side intercept function 80 waits for an event on the simplex virtual socket 70 as indicated in block 326. This wait operation is carried out by performing the virtual select function which is described in FIG. 16-4. Upon receipt of an event, the event is examined as reflected in block 330. If the event is a virtual socket close, then the client-side intercept function 80 deletes the simplex virtual socket 70 as reflected in block 349 and terminates as reflected in block 350 of FIG. 14.

Figures 1, 16:
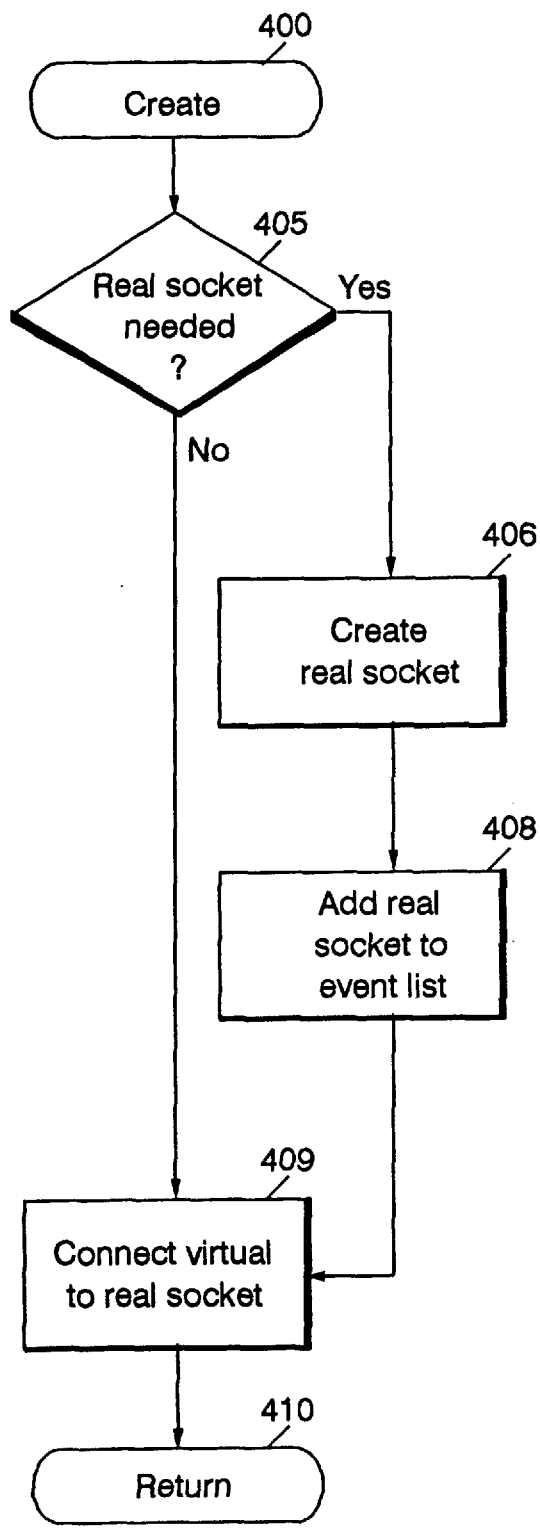
Figures 2, 16:
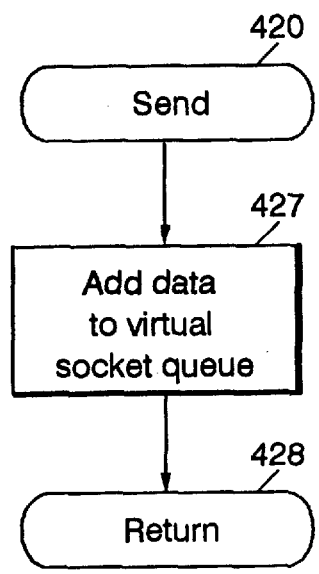
Figures 3, 16:
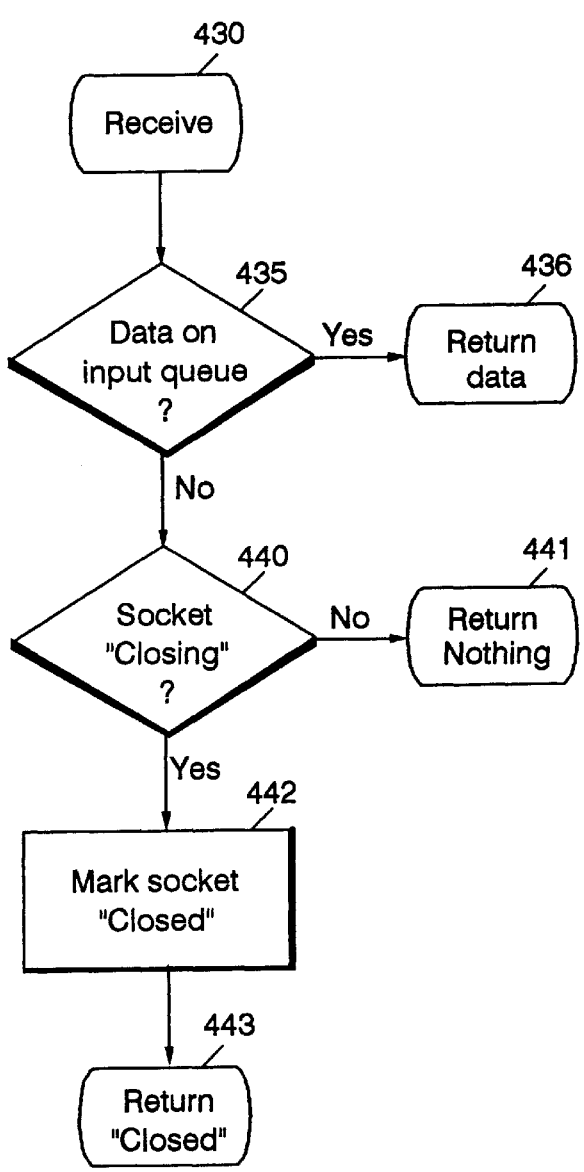
Figures 4, 16:
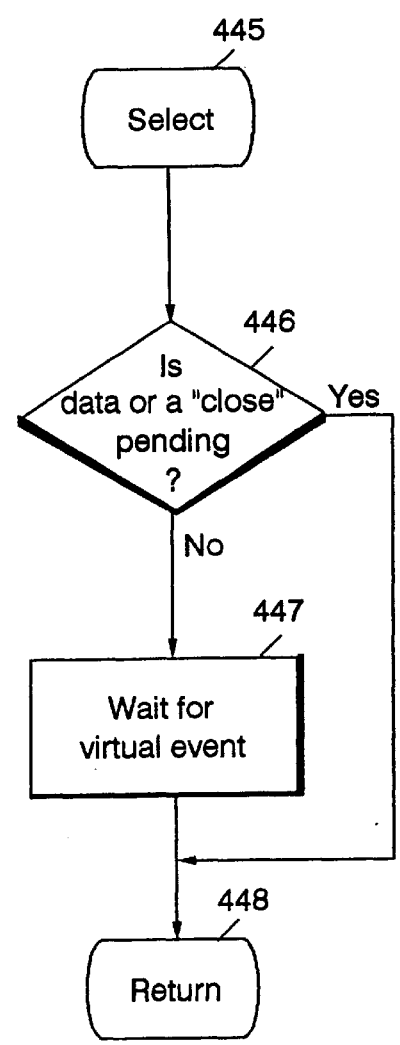

If the event is the receipt of data, then the path from block 330 to block 331 is taken and the client-side intercept function 80 receives the browser originated communication from the simplex virtual socket 70 by executing the virtual receive operation described herein with reference to FIG. 16-3. The client-side intercept function then carries out the function of the client-side intercept module as described above (see for example FIGS. 3 and 7), which is reflected in block 332. The client-side intercept function 80 then creates a multiplex virtual socket 90 which is connected to the real socket 36a in the client-side intercept module 30. Real socket 36a is connected to real socket 36b on the server-side intercept module 40. The creation of the multiplex virtual socket is reflected in block 333 of FIG. 14 and carried out by performing the virtual create operation described herein with reference to FIG. 16-1. Block 334 reflects the operation of sending the information received from the web browser over the real socket 60b and the simplex virtual socket 70 after the client-side intercept function 80 is carried out for the web browser originated communication. This communication is queued to the multiplex virtual socket 90 by performing the virtual send operation described herein with reference to FIG. 16-2. The client-side intercept function 80, after queuing the request to the multiplex virtual socket 90, flushes the data queued in the multiplex virtual socket 90 as reflected in block 335 of FIG. 14, and then waits for an event on the multiplex virtual socket as reflected in block 336. The virtual flush function is carried out by performing the virtual flush operation described herein with reference to FIG. 17-1 which takes the data from the multiplexed virtual socket queue and provides the data to the real socket 36a. The wait operation may be carried out by performing the virtual select function described in FIG. 16-4. At this point, the client-side intercept module has intercepted the web browser originated communication and transferred the communication to the server-side intercept module over the external communication link 35.

Returning to FIG. 13, which reflects the flowchart for the socket manager in either the server-side intercept module 40 or the client-side intercept module 30. The real socket manager in the server-side intercept module or the server socket manager, shown as block 69 in FIG. 12, carries out the same function as the client socket manager shown as block 68. In creating a first real socket as shown in block 301, the server-side intercept module 30 creates a "well known port" 37b for receiving requests for sockets from the client-side intercept module 30 associated with the server-side intercept module 40. When a real event occurs on the real socket 36b of the server-side intercept module 40, the event is examined as reflected in block 305. In the present case, the event is the receipt of data from real socket 36a and so the path from block 305 to block 320 of FIG. 13 is taken. The data received on real socket 36b is examined and, in our present example, because the data is a web browser originated communication transmitted by the client-side intercept module, a new virtual socket must be created in the server-side intercept module 40. Thus the path from block 320 to block 321 of FIG. 13 is taken. The server socket manager 69 then carries out the operations reflected in block 321, block 322, block 323, and block 324 of FIG. 13. The server socket manager 69 creates a multiplex virtual socket 95, as shown in block 321, cancels the multiplex socket activity timer as reflected in block 322 and initiates an application of the server-side intercept function as reflected in block 323 of FIG. 13 and shown as block 85 in FIG. 12. The data received at the real socket 36b is then queued to the multiplex virtual socket 95 and a virtual event is signaled.

Figure 15:
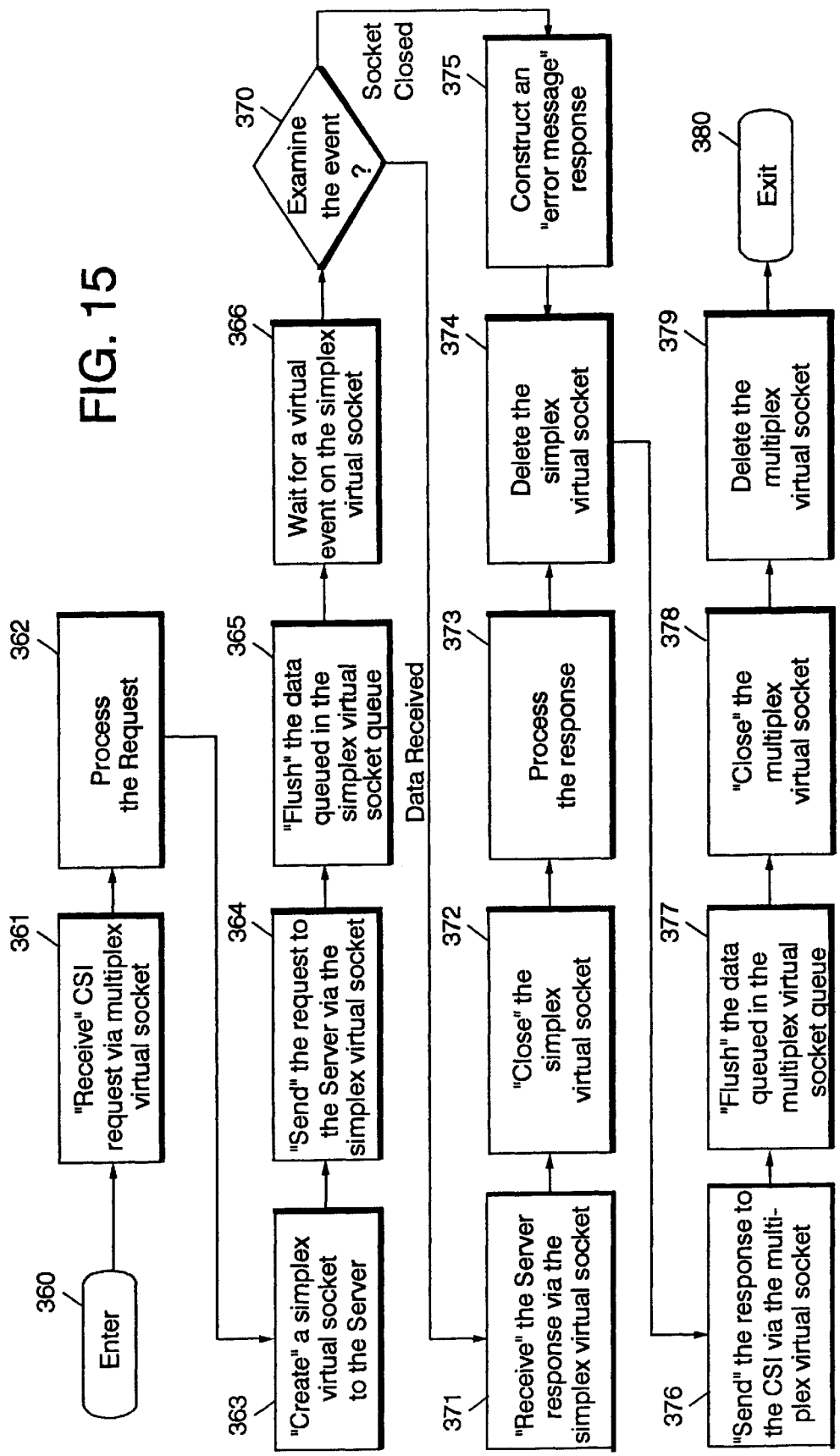
FIG. 15 is a flow diagram depicting operations carried out by a server-side intercept function in one embodiment of the present invention utilizing virtual sockets.

The creation of the server-side intercept function, as reflected in block 323, is shown as block 360 of FIG. 15. After creation of the server-side intercept function 85, the function receives the data from the multiplex virtual socket 95 which was sent from the client-side intercept module 30 and corresponds to the web browser originated communication. This operation is reflected as block 361 of FIG. 15. After receiving the data from the client-side intercept module, the server-side intercept function 85 processes the data as described above for the server-side intercept module. The carrying out of the server-side functions is reflected in block 362 (see for example FIGS. 5 and 9). After processing the information, the server-side intercept function 85 creates a simplex virtual socket 75 by performing a virtual create, the operation of which is described herein with reference to FIG. 16-1. This operation is reflected in block 363 of FIG. 15. The server-side intercept function 85 then sends the web browser originated communication to the simplex virtual socket 75 as shown in block 364 by performing a virtual send, the operation of which is describe herein with reference to FIG. 16-2. The server-side intercept function 85 then performs a virtual flush to flush data queued in the simplex virtual socket 75 to the real socket 60c and waits for an event on the simplex virtual socket 75. The virtual flush operation is described herein with reference to FIG. 17-1. The send and flush operations are shown in blocks 364 and 365 of FIG. 15. The wait operation may be carried out by performing the virtual select function described in FIG. 16-4. When the server-side intercept function 85 created the simplex virtual socket 75, a corresponding real socket 60c was also created. By sending the web browser originated communication to the simplex virtual socket 75, the server-side intercept function 85 transferred the web browser originated communication to the web server.

When the server-side intercept module 40 receives the response from the web server on the real socket 60c, a real event occurs and the server socket manager 69 exits block 302 of FIG. 13 and examines the event which occurred on real socket 60c as reflected in block 305. In the present case, it will be data for an existing virtual socket and the path from block 320 of FIG. 13 to block 324 will be taken. The data received on the real socket 60c is queued to the virtual socket 75 and a virtual event is signaled. When the virtual event is signaled, the virtual-side intercept function 85 exits block 366 of FIG. 15 and examines the event as shown in block 370. If the event is a socket closed, then an error condition occurs and an error message is constructed as the response as shown in block 375 of FIG. 15. However, if the event is the receipt of data, then the path from block 370 to block 371 is taken and the server-side intercept function 85 performs a virtual receive, as described herein with reference to FIG. 16-3, to obtain the server response from the simplex virtual socket 75 as shown in block 371. The server-side intercept function 85 then performs a virtual close of the simplex virtual socket 75 as reflected in block 372 and described herein with reference to FIG. 17-2 and processes the response as described above for the server-side intercept module and shown in block 373 (see for example FIGS. 6 and 10).

Whether the exit path of block 370 of FIG. 15 is the error path to block 375 or the data path to block 371, at block 374 the simplex virtual socket 75 is deleted. The server-side intercept function then performs a virtual send operation to the multiplex virtual socket 95 to transmit the web server originated communication to the client-side intercept module 30, as shown in block 376. The server-side intercept function 85 then performs a virtual flush operation to flush the data queued in the multiplex virtual socket 95. These operations are shown in block 377. The server-side intercept function 85 then performs a virtual close operation to close the multiplex virtual socket 95 as shown in block 378 of FIG. 15. Finally, the server-side intercept function 85 deletes the multiplex virtual socket and terminates, as reflected in blocks 379 and 380.

The server-side intercept function performs the virtual send and flush operations to the multiplex virtual socket 95. These trigger events on the real socket 36a and the client socket manager 68 exits block 302 and examines the event, as shown in block 305, because the data is received on real socket 36a, the path from block 305 to block 320 of FIG. 13 is taken and the data is queued to multiplex virtual socket 90. Therefore, when real sock 36a receives the web server response from real socket 36b over the external communication link 35, this information is demultiplexed and provided to the appropriate multiplex virtual socket. The receipt of the data causes a virtual event to occur as shown in block 324 of FIG. 13 and block 336 of FIG. 14 would be exited and the client-side intercept function 80 would examine the event as reflected in block 340 of FIG. 14.

Figure 14:
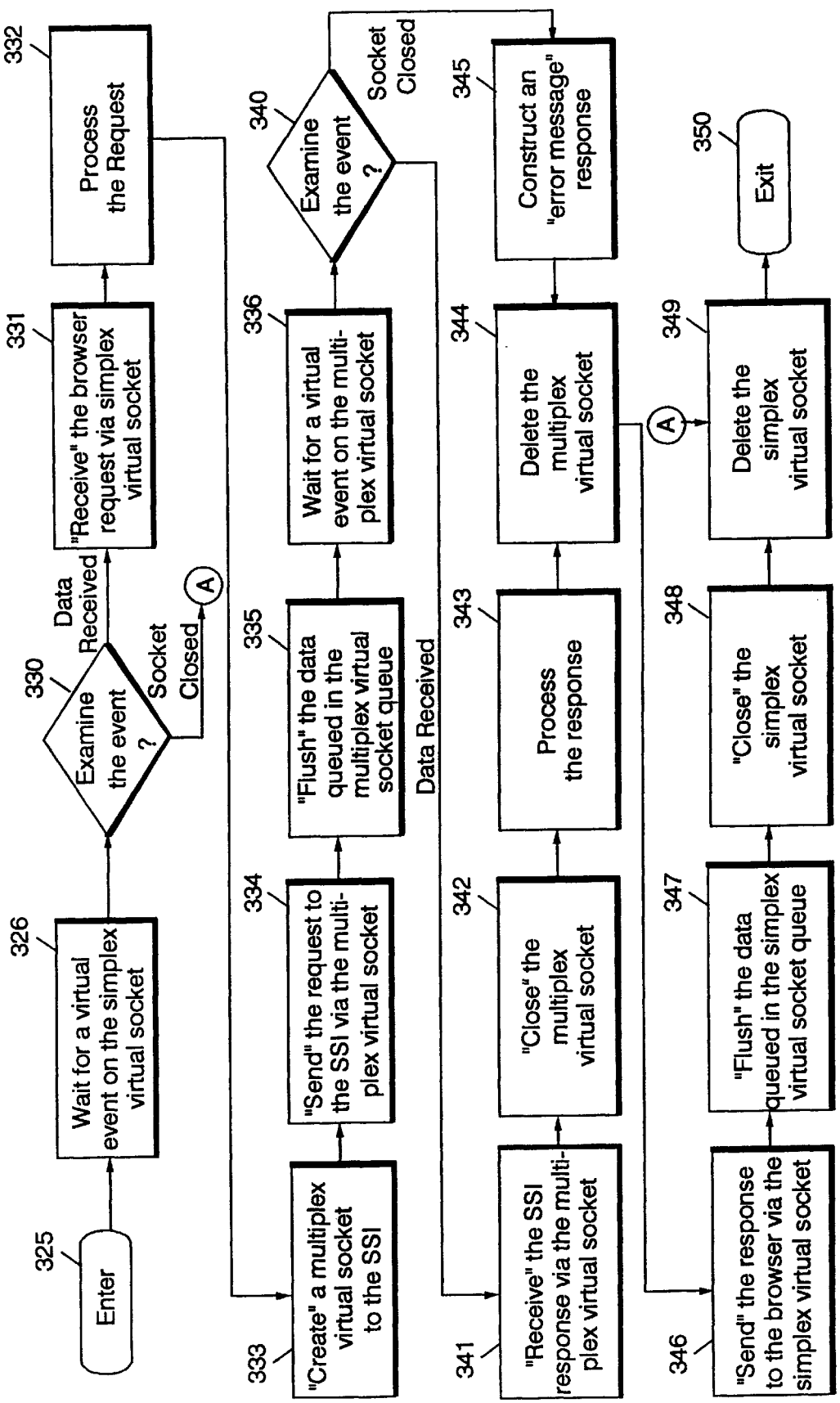
FIG. 14 is a flow diagram depicting operations carried out by a client-side intercept function in one embodiment of the present invention utilizing virtual sockets.

If the event is a socket closed response, then the path from block 340 to block 345 of FIG. 14 is taken and the client-side intercept function 80 creates an error message response and proceeds to block 344 of FIG. 14. If the event is data received, as would be the case in the present example, then the path from block 340 to block 341 of FIG. 14 is taken and the client-side intercept function 80 performs a virtual receive operation to receive the response from the multiplex virtual socket 90. This receive operation is reflected in block 341 of FIG. 14. After receiving the data from the multiplex virtual socket 90, the client-side intercept function 80 performs a virtual close operation to close the multiplex virtual socket 90 as reflected in block 342. The client-side intercept function 80 then processes the response as described above for the client-side intercept module as reflected in block 343 (see for example FIGS. 4 and 8).

The operations of block 344 are then carried out whichever path is taken exiting block 340. The client-side intercept function 80 deletes the multiplex virtual socket as shown in block 344 and then performs the virtual send operation to send the response to the browser via the simplex virtual socket 70 as shown in block 346. When the virtual send operation completes, the client-side intercept function 80 performs a virtual flush operation to flush the data queued in the simplex virtual socket as shown in block 347 to the real socket 60b and then performs a virtual close operation to close the simplex virtual socket as shown in block 348. After closing the simplex virtual socket to the client-side intercept function the simplex virtual socket is deleted and the client-side intercept function terminates as shown in blocks 349 and 350 of FIG. 14.

As will be appreciated by one of skill in the art, the present invention has been described with respect to one particular instance of the creation of simplex and multiplex virtual sockets and client-side intercept and server-side intercept functions, however, a plurality of these functions may be created within a single client-side intercept module or server-side intercept module. Accordingly, a client-side intercept module and server-side intercept module according to the present invention may create a TCP/IP connection between the client-side intercept module 30 and a server-side intercept module 40 and then multiplex on the TCP/IP connection plurality of web browser or web server originated communications while maintaining the TCP/IP connection.

Figure 1:
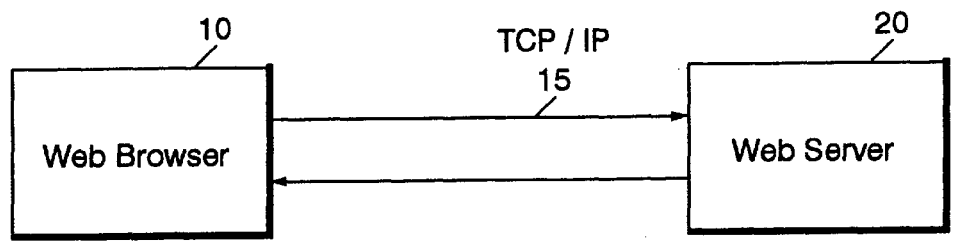
FIG. 1 is a block diagram of a typical web browser/web server system.

The remaining functions of the client socket manager and the server socket manager may best be understood with reference to FIGS. 16-1 through 16-4 and FIGS. 17-1 and 17-2 which describe the operations carried out by the client-side intercept module and the server-side intercept module when a virtual create, a virtual send, a virtual receive, a virtual select, a virtual flush, or a virtual close operation is executed as reflected in flowcharts of FIG. 14 and FIG. 15. When a virtual create operation is performed, such as shown in block 333 of FIG. 14 and block 363 of FIG. 15, the operations beginning with block 400 of FIG. 16-1 are carried out. The socket manager then determines if a real socket is required as shown in block 405. If a real socket already exists, such as when create creates a multiplex virtual socket which is to be connected to an existing real socket, then the "No" path out of block 405 is taken and the virtual socket is connected to the real socket as shown in block 409. If, however, a real socket is required, then the "Yes" path of block 405 is taken. As seen in block 406, a real socket is created. The real socket is then added to the event list as shown in block 408 for monitoring as reflected in block 302 of FIG. 13. After creating a real socket and establishing a connection, the virtual socket is then connected to the real socket as shown in block 409 and create operation is completed as shown in block 410.

For carrying out the virtual send operation reflected in blocks 334 and 346 of FIG. 14, or blocks 364 and 376 of FIG. 15, the operations beginning with block 420 of FIG. 16-2 are carried out. The data is added to the virtual socket queue as shown in block 427 and when complete, the send operation terminates as shown in block 428.

The virtual receive operation reflected in blocks 331 and 341 of FIG. 14 and blocks 361 and 371 of FIG. 15 are performed by carrying out the operations beginning at block 430 of FIG. 16-3. As shown in block 435, the virtual socket queue is evaluated to determine if any data is present on the virtual socket queue. If data is present on the virtual socket queue, then the "Yes" path of block 435 is taken and the data is returned to the function calling the receive operation as shown in block 436. If there is no data on the virtual socket queue and the socket is not marked as closing, then the "No" path of decision block 440 is taken and nothing is returned as shown in block 441. However, if there is no data on the queue and the socket is marked as closing, then the "Yes" path of block 440 is taken and the socket is marked closed as shown in block 442 and the closed socket response is returned to the operation requesting the receive as shown in block 443.

Figure 4:
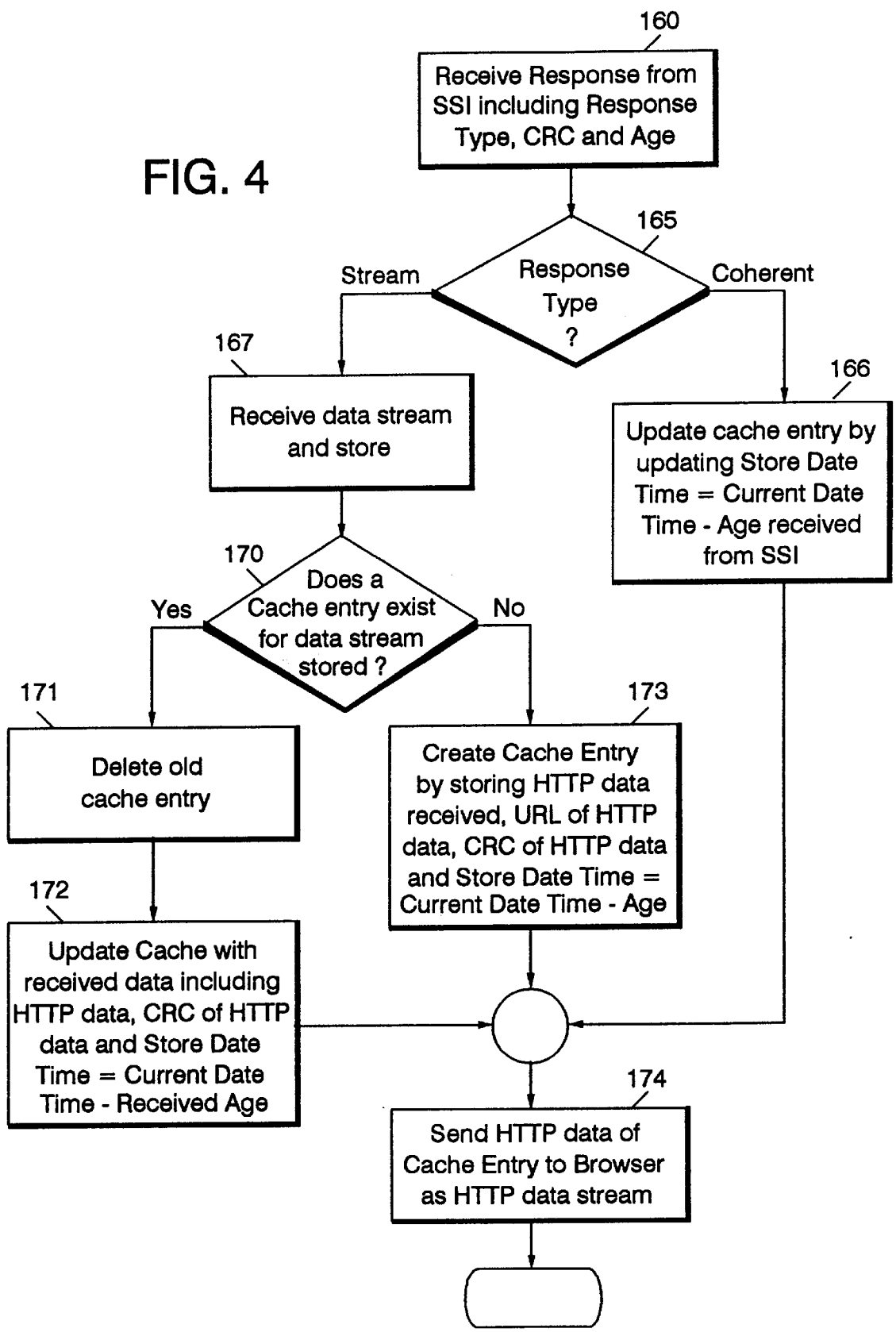
FIG. 4 is a flow diagram depicting operations carried out by a client-side intercept module in a preferred embodiment of the present invention implementing a coherent caching system.

The virtual select operation carried out in blocks 326 and 336 of FIG. 14 and block 366 of FIG. 15 is performed by carrying out the operations beginning with block 445 of FIG. 16-4. As seen in block 446 it is first determined if data or a virtual close operation is pending for the selected virtual socket. If no data or virtual close are pending then the "no" path out of block 446 is taken and the process waits for a virtual event on the selected virtual socket as reflected in block 447 and terminates after receiving such an event as reflected in block 448. If data or a virtual close is pending for the selected virtual socket the a virtual event has already occurred and the "yes" path out of block 446 is taken and the process terminates as reflected in block 448.

Figures 1, 17:
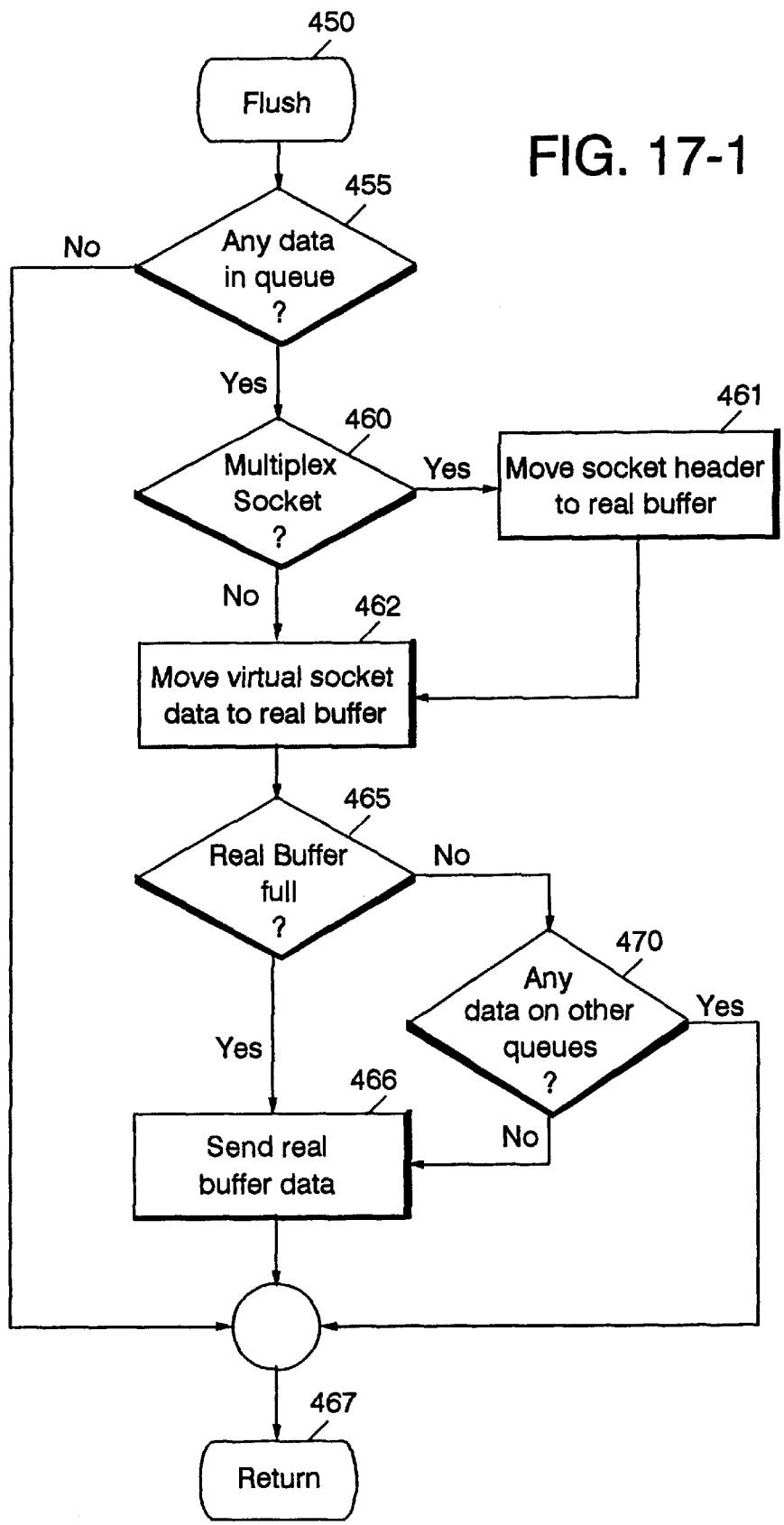
Figures 2, 17:
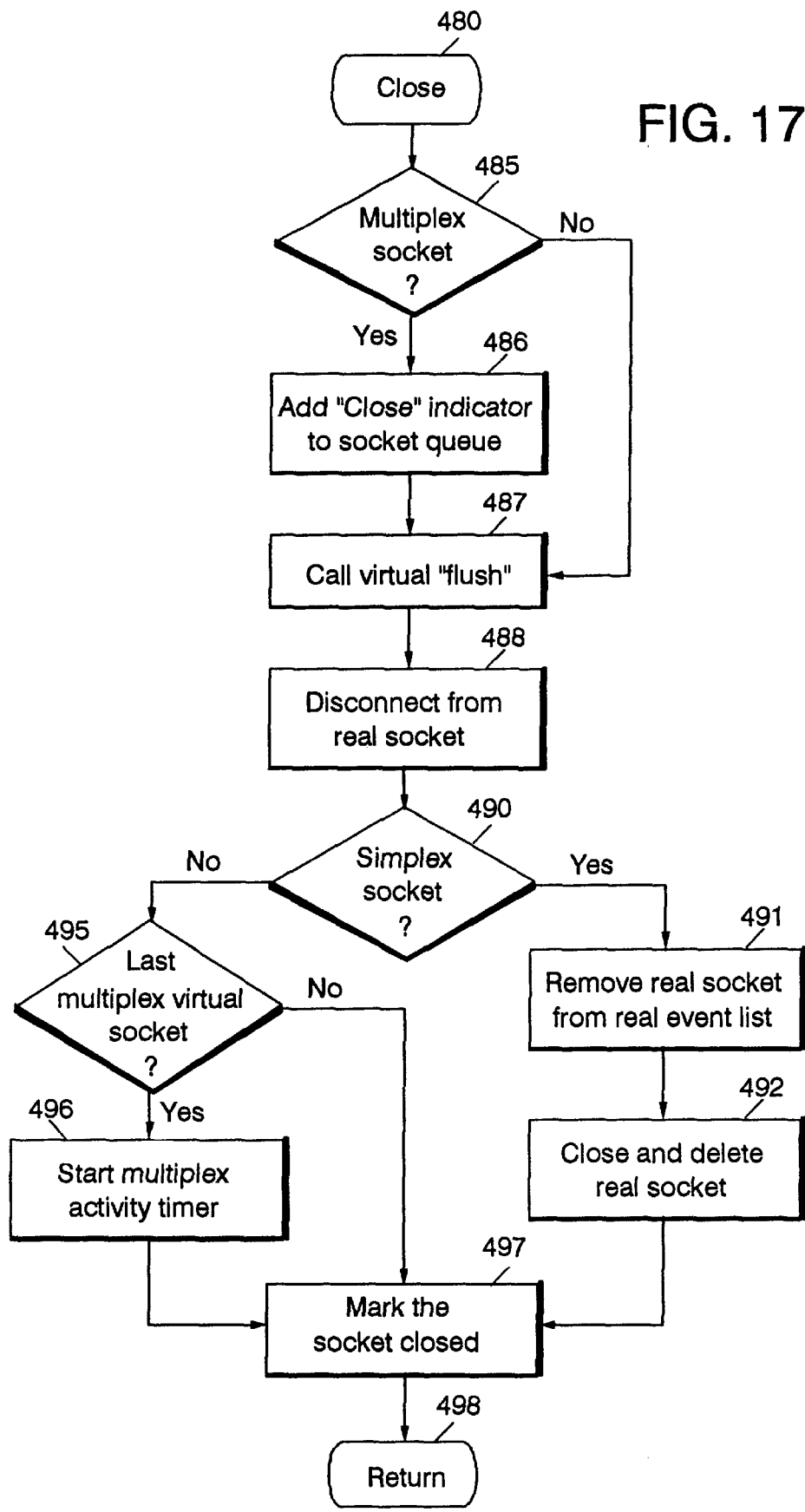

The virtual flush operation referred to in blocks 335 and 347 of FIG. 14 and blocks 365 and 377 of FIG. 15 is performed by carrying out the operations beginning with block 450 of FIG. 17-1. When called, the virtual flush operation determines if there is any data in the virtual socket queue to be flushed as reflected in the decision block 455. If there is no data in the virtual socket queue, then the flush operation simply terminates and returns to the calling function as reflected by the "No" path of block 455. If, however, there is data in the queue, then the "Yes" path of block 455 is taken and it is determined if the virtual socket queue is for a multiplex socket as shown in block 460. If it is a multiplex socket, then the socket header, which consists of three bytes reflecting a unique identifier for the socket and the amount of data in the transfer, is added to the real socket buffer as reflected in block 461. In either case, if it is a multiplex socket or a simplex socket, the data for the real socket is then moved to the real socket buffer as shown in block 462. If the real socket buffer is full, then the "Yes" path of block 465 is taken and the data from the real socket buffer is sent on the real socket as shown in block 466. If the real buffer is not full, then the "No" path of block 465 is taken. The virtual flush function then tests to determine if there is any other data on any other multiplex virtual socket queue which is to be sent to the real socket. If the answer is Yes, then the "yes" path of block 470 is taken and the data in the real socket buffer is not sent until the virtual flush operation is called again to flush one of the other virtual socket queues. If there is no other data or after adding the data from the other multiplex virtual sockets, then the operation of block 466 is carried out and the data in the real socket buffer is sent on the real socket. After all the data in the virtual socket queue corresponding to the function which called the virtual flush operation is sent to the real socket, then the virtual flush operation terminates as reflected in block 467.

The virtual close operation shown in blocks 342 and 348 of FIG. 14 and blocks 372 and 378 of FIG. 15 is carried out by performing the operations beginning with block 480 of FIG. 17-2. When the virtual close operation is called, the operation first tests to determine if the virtual close is of a multiplex virtual socket as reflected in block 485. If it is a multiplex virtual socket, then the "Yes" path of block 485 is taken and the "close" operation indicator is added to the virtual socket queue. Whether the virtual close is of a multiplex virtual socket or not, the virtual close operation calls the virtual flush operation as shown in block 487 and then disconnects from the real socket as shown in block 488. The operation then tests to see if the virtual close is of a simplex virtual socket as shown in block 490, and if not, the "No" path is taken to block 495. Because the close is of a multiplex virtual socket, block 495 tests to determine if it's the last multiplex virtual socket and, if it is the last multiplex virtual socket, sets the multiplex activity timer as shown in block 496. If it is not the last multiplex virtual socket, then block 496 is skipped.

Returning to block 490, if the virtual close is of a simplex virtual socket, then the corresponding real socket is removed from the event list as shown in block 491 and the real socket is closed and deleted as shown in block 492. Whether the socket is simplex or multiplex virtual socket, the virtual socket is marked as closed in block 497 and the close operation terminates in block 498.

FIG. 13 will now be described as it relates to FIGS. 16-1 through 16-4 and FIGS. 17-1 and 17-2. When a real event occurs, block 302 of FIG. 13 is exited and the socket manager examines the event based upon how the event was generated. If the event is the timing out of the multiplex socket activity timer which was set in block 496 of FIG. 17-2, then the path from block 305 to block 312 is taken in FIG. 13. As shown in FIG. 13, the operations of block 312 and 313 are then carried out by the socket manager to close the multiplex real socket and delete the multiplex real socket which corresponds to the socket which connects the client-side intercept module to the server-side intercept module. The socket manager then waits for the next real event. This multiplex event timer is reset by the creation of a multiplex virtual socket as shown in block 322.

If the event occurring on the real socket is a real socket close such as the web server performing a close operation on the socket connections between the web server and the server-side intercept module, then the path from block 305 to block 309 of FIG. 13 is taken. The socket manager removes the real socket from the real event list as shown in block 309 and disconnects the virtual socket or sockets in the case of multiple multiplex sockets from the real socket or sockets as shown in block 310. The socket manager then marks the virtual socket as closing and signals a virtual event. This operation is reflected in block 311 and when all data is emptied from the virtual socket queue, the virtual socket will close. After marking the virtual socket as closing, the socket manager then determines whether or not the real socket, which is to be closed, is a simplex socket as shown in decision block 315. If the real socket closing is a simplex socket, then the real socket is closed and deleted as reflected in block 316. The socket manager then waits for the next real event as shown in block 302.

If it is not a simplex real socket which is being closed, then the "No" path of block 315 is taken and the socket manager then waits for the next real event. Thus, the multiplex real socket or the socket connecting the client-side intercept module and the server-side intercept module can only be closed by the timeout of the multiplex socket activity timer. This allows for the maintenance of the connection between the client-side intercept module and the server-side intercept module even after the last communication between the modules has occurred for a user specified predetermined time. In the event of a subsequent connection request from the browser prior to the timing out of the multiplex socket activity timer, the communication could be carried out without reestablishing the connection between the client-side intercept module and the server-side intercept module and thereby eliminating the need for the overhead of reestablishing such a connection.

The final path to be described of FIG. 13 is when a real event occurs and the event is the receipt of data on the multiplex real socket or sockets 36a or 36b in FIG. 12. When data is received on the multiplex real sockets, this data is examined and in the event the data includes the close operation indicator such as that added to a virtual queue in block 486 of FIG. 17-2, then a virtual close operation is performed and the path from block 320 to block 310 is taken. The socket manager disconnects from the real socket the multiplex virtual socket identified in the data received on the real socket as shown in block 310 and then marks the virtual socket as "closing" and signals a virtual event as shown in block 311. Because the close is the close of a multiplex virtual socket, the "No" path out of block 315 is taken and the socket manager waits for another real event as shown in block 302.

Through carrying out the operations described in FIGS. 13 through 17 a particular aspect of the present invention establishes a persistent connection between the first computer and the second computer over the external communication link. The persistent connection is maintained until all web browser originated communications are completed and a plurality of web browser originated communications are intercepted and multiplexed them onto the external communication link while the persistent connection is maintained. The client/server specific data stream may then be demultiplexed to create a plurality of HTTP data streams and the plurality of HTTP data streams are provided to the web server. The persistent connection is also maintained until all web server originated communications are completed. A plurality of web server originated communications are intercepted and multiplexed onto the external communication link while the persistent connection is maintained. Furthermore, the client/server specific data stream may be demultiplexed to create a plurality of HTTP data streams and the plurality of HTTP data streams provided to the web server.

In the drawings and specification, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of reducing the data transmitted over a communication link from a first application resident in a first computer and to a second application resident in a second computer wherein the data is transmitted over an external communication link from the first computer to the second computer, the method comprising:

storing a data stream from the first application to be provided to the second application in response to a CGI request from the second application in a cache resident in the first computer to create a server base cache entry;

storing a data stream to be provided to the second application in response to a CGI request from the second application in a cache resident in the second computer to create a client base cache entry;

evaluating the requests from the second application to determine if a client base cache entry corresponding to the interrogated request exists to provide a client CGI base form;

interrogating requests from the second application to determine if a server base cache entry corresponding to the interrogated request exists to provide a server CGI base form;

intercepting the data stream corresponding to the response originated by the first application in response to the interrogated request from the second application prior to transmission of the response on the external communication link;

comparing the intercepted response to the server CGI base form to provide difference data corresponding to the difference between the intercepted response and the server CGI base form;

sending the difference data to the second computer over the external communication link;

acquiring the difference data transmitted over the external communication link sent by the first computer;

reconstructing the response data stream corresponding to the communication from the first application from the client/server specific data stream received over the external communication link by combining the client CGI base form with the difference data received over the external communication link to create a response data stream corresponding to the intercepted response;

selectively updating the client cache entry corresponding to the client CGI base form so as to provide a new client CGI base form wherein the CGI base form is updated with the received difference data if an update criteria is met; and providing the reconstructed data stream corresponding to the intercepted response to the second application.

2. The method of claim 1 further comprising the steps of:

determining if the difference between the server base form and the intercepted response is greater than a predefined difference threshold;

updating the server base form corresponding to the interrogated request by storing the intercepted response data stream received from the first application as the server base cache entry corresponding to the intercepted request if the difference between the server base form and the intercepted response is greater than the predefined difference threshold; and wherein said comparing step and said sending step utilizes the updated server base form.

3. The method of claim 1 wherein the first application comprises a web server and the second application comprises a web browser.

4. The method of claim 1 wherein the external communication link comprises a wireless communication link.

5. An apparatus for reducing the amount of data transmitted from a first application resident in a first computer to a second application resident in a second computer in response to a request from the second application wherein the data is transmitted over an external communication link from the first computer to the second computer, the apparatus comprising:

means for storing a data stream from the first application to be provided to the second application in response to a CGI request from the second application in a cache resident in the first computer to create a server base cache entry;

means for storing a data stream to be provided to the second application in response to a CGI request from the second application in a cache resident in the second computer to create a client base cache entry;

means for evaluating the requests from the second application to determine if a client base cache entry corresponding to the interrogated request exists to provide a client CGI base form;

means for interrogating requests from the second application to determine if a server base cache entry corresponding to the interrogated request exists to provide a server CGI base form;

means for intercepting the data stream corresponding to the response originated by the first application in response to the interrogated request from the second application prior to transmission of the response on the external communication link;

means for comparing the intercepted response to the server CGI base form to provide difference data corresponding to the difference between the intercepted response and the server base form;

means for sending the difference data to the second computer over the external communication link;

means for acquiring the difference data transmitted over the external communication link sent by the first computer;

means for reconstructing the response data stream corresponding to the communication from the first application from the client/server specific data stream received over the external communication link by combining the client CGI base form with the difference data received over the external communication link to create a response data stream corresponding to the intercepted response;

means for selectively updating the client cache entry corresponding to the client CGI base form so as to provide a new client CGI base form wherein the CGI base form is updated with the received difference data if an update criteria is met; and means for providing the reconstructed data stream corresponding to the intercepted response to the second application.

6. The apparatus of claim 5 further comprising:

means for determining if the difference between the server base form and the intercepted response is greater than a predefined difference threshold;

means for updating the server base form corresponding to the interrogated request by storing the intercepted response data stream received from the first application as the server base cache entry corresponding to the intercepted request if the difference between the server base form and the intercepted response is greater than the predefined difference threshold; and wherein said means for comparing and said means for sending utilizes the updated server base form.

7. The apparatus of claim 5 wherein the first application comprises a web server and the second application comprises a web browser.

8. The apparatus of claim 5 wherein the external communication link comprises a wireless communication link.

9. A computer program product for reducing the amount of data transmitted from a first application resident in a first computer to a second application resident in a second computer in response to a request from the second application wherein the data is transmitted over an external communication link from the first computer to the second computer, the computer program product comprising:

a computer-readable storage medium having computer-readable program code means embodied in said medium, said computer-readable program code means comprising:

computer readable program code means for storing a data stream from the first application to be provided to the second application in response to a CGI request from the second application in a cache resident in the first computer to create a server base cache entry;

computer readable program code means for storing a data stream to be provided to the second application in response to a CGI request from the second application in a cache resident in the second computer to create a client base cache entry;

computer readable program code means for evaluating the requests from the second application to determine if a client base cache entry corresponding to the interrogated request exists to provide a client CGI base form;

computer readable program code means for interrogating requests from the second application to determine if a server base cache entry corresponding to the interrogated request exists to provide a server CGI base form;

computer readable program code means for intercepting the data stream corresponding to the response originated by the first application in response to the interrogated request from the second application prior to transmission of the response on the external communication link;

computer readable program code means for comparing the intercepted response to the server base form to provide difference data corresponding to the difference between the intercepted response and the server CGI base form;

computer readable program code means for sending the difference data to the second computer over the external communication link;

computer readable program code means for acquiring the difference data transmitted over the external communication link sent by the first computer; computer readable program code means for reconstructing the response data stream corresponding to the communication from the first application from the client/server specific data stream received over the external communication link by combining the client CGI base form with the difference data received over the external communication link to create a response data stream corresponding to the intercepted response;

computer readable program code means for selectively updating the client cache entry corresponding to the client CGI base form so as to provide a new client CGI base form wherein the CGI base form is updated with the received difference data if an update criteria is met; and computer readable program code means for providing the reconstructed data stream corresponding to the intercepted response to the second application.

10. The computer program product of claim 9 further comprising:

computer readable program code means for determining if the difference between the server base form and the intercepted response is greater than a predefined difference threshold;

computer readable program code means for updating the server base form corresponding to the interrogated request by storing the intercepted response data stream received from the first application as the server base cache entry corresponding to the intercepted request if the difference between the server base form and the intercepted response is greater than the predefined difference threshold; and wherein said computer readable program code means for comparing and said computer readable program code means for sending utilizes the updated server base form.

11. The computer program product of claim 9 wherein the first application comprises a web server and the second application comprises a web browser.

12. The apparatus of claim 9 wherein the external communication link comprises a wireless communication link.

13. A method of reducing the data transmitted over a communication link from a first application resident in a first computer and to a second application resident in a second computer wherein the data is transmitted over an external communication link from the first computer to the second computer, the method comprising:

storing a data stream from the first application to be provided to the second application in response to a request from the second application in a cache resident in the first computer to create a server base cache entry;

storing a data stream to be provided to the second application in response to a request from the second application in a cache resident in the second computer to create a client base cache entry;

evaluating the requests from the second application to determine if a client base cache entry corresponding to the interrogated request exists to provide a client base form;

interrogating requests from the second application to determine if a server base cache entry corresponding to the interrogated request exists to provide a server base form;

intercepting the data stream corresponding to the response originated by the first application in response to the interrogated request from the second application prior to transmission of the response on the external communication link;

comparing the intercepted response to the server base form to provide difference data corresponding to the difference between the intercepted response and the server base form;

sending the difference data to the second computer over the external communication link;

acquiring the difference data transmitted over the external communication link sent by the first computer;

providing the reconstructed data stream corresponding to the intercepted response to the second application, determining if the server base form is identical to the client base form;

transmitting the server base form to the second computer over the external communication link if the server base form is not identical to the client base form;

reconstructing the response data stream corresponding to the communication from the first application from the client/server specific data stream received over the external communication link by combining the client base form with the difference data received over the external communication link to create a response data stream corresponding to the intercepted response if the server base form is not transmitted to the second computer and reconstructing the intercepted response data stream corresponding to the response from the first application by combining the server base form received over the external communication link with the difference data received over the external communication link to create a data stream corresponding to the intercepted response if the server base form is transmitted to the second computer; and updating the client base form corresponding to the interrogated request by storing the received server base form as the client base cache entry corresponding to the interrogated request.

14. The method of claim 13 further comprising the steps of:

determining if the difference between the server base form and the intercepted response is greater than a predefined difference threshold;

updating the server base form corresponding to the interrogated request by storing the intercepted response data stream received from the first application as the server base cache entry corresponding to the intercepted request if the difference between the server base form and the intercepted response is greater than the predefined difference threshold; and wherein said comparing step and said sending step utilizes the updated server base form.

15. The method of claim 13 further comprising the steps of:

maintaining a plurality of server base cache entries which correspond to the request from the second application;

wherein said interrogating step comprises determining if a plurality of server base cache entries exist corresponding to the request from the second application to provide a plurality of server base forms;

determining if one of the plurality of server base forms is identical to the client base form; and wherein said comparing step utilizes the one of the plurality of server base forms which is identical to the client base form if said determining step determines that one of the plurality of server base forms is identical to the client base form.

16. The method of claim 13 further comprising the steps of:

updating the server cache entry with the data stream from the first application in response to the request from the second application;

maintaining a plurality of difference data sets which correspond to the request from the second application and which represent the differences between successive server cache entries to provide archival difference data;

maintaining a plurality of CRC entries wherein each of said plurality of CRC entries is associated with one of said plurality of difference data sets and uniquely identify the server base form from which said difference data set was derived;

wherein said interrogating step comprises determining if a plurality of difference data sets and CRCs exist corresponding to the request from the second application;

determining if one of said plurality of CRCs is corresponds to a server base form which is identical to the client base form;

wherein said sending step comprises sending the archival difference data corresponding to the CRC which corresponds to the client base form the successive archival difference data sets and the difference data calculated by said comparing step to the second computer over the external communication link;

wherein said reconstructing step comprises reconstructing the response data stream corresponding to the communication from the first application from the data stream received over the external communication link by successively combining the client base form with the difference data received over the external communication link to create a response data stream corresponding to the intercepted response;

updating the client cache entry corresponding to the request from the second application with the reconstructed data stream.

17. The method of claim 13 wherein the first application comprises a web server and the second application comprises a web browser.

18. The method of claim 13 wherein the external communication link comprises a wireless communication link.

19. The method of claim 17 wherein the request from the web browser comprises a CGI request.

20. An apparatus for reducing the data transmitted over a communication link from a first application resident in a first computer and to a second application resident in a second computer wherein the data is transmitted over an external communication link from the first computer to the second computer, comprising:

means for storing a data stream from the first application to be provided to the second application in response to a request from the second application in a cache resident in the first computer to create a server base cache entry;

means for storing a data stream to be provided to the second application in response to a request from the second application in a cache resident in the second computer to create a client base cache entry;

means for evaluating the requests from the second application to determine if a client base cache entry corresponding to the interrogated request exists to provide a client base form;

means for interrogating requests from the second application to determine if a server base cache entry corresponding to the interrogated request exists to provide a server base form;

means for intercepting the data stream corresponding to the response originated by the first application in response to the interrogated request from the second application prior to transmission of the response on the external communication link;

means for comparing the intercepted response to the server base form to provide difference data corresponding to the difference between the intercepted response and the server base form;

means for sending the difference data to the second computer over the external communication link;

means for acquiring the difference data transmitted over the external communication link sent by the first computer;

means for providing the reconstructed data stream corresponding to the intercepted response to the second application;

means for determining if the server base form is identical to the client base form;

means for transmitting the server base form to the second computer over the external communication link if the server base form is not identical to the client base form;

means for reconstructing the response data stream corresponding to the communication from the first application from the client/server specific data stream received over the external communication link by combining the client base form with the difference data received over the external communication link to create a response data stream corresponding to the intercepted response if the server base form is not transmitted to the second computer and for reconstructing the intercepted response data stream corresponding to the response from the first application by combining the server base form received over the external communication link with the difference data received over the external communication link to create a data stream corresponding to the intercepted response if the server base form is transmitted to the second computer; and means for updating the client base form corresponding to the interrogated request by storing the received server base form as the client base cache entry corresponding to the interrogated request.

21. The apparatus of claim 20 further comprising:

means for determining if the difference between the server base form and the intercepted response is greater than a predefined difference threshold;

means for updating the server base form corresponding to the interrogated request by storing the intercepted response data stream received from the first application as the server base cache entry corresponding to the intercepted request if the difference between the server base form and the intercepted response is greater than the predefined difference threshold; and wherein said means for comparing and said means for sending utilizes the updated server base form.

22. The apparatus of claim 20 further comprising:

means for maintaining a plurality of server base cache entries which correspond to the request from the second application;

wherein said means for interrogating comprises means for ascertaining if a plurality of sever base cache entries exist corresponding to the request from the second application to provide a plurality of server base forms;

means for determining if one of the plurality of server base forms is identical to the client base form; and wherein said means for comparing utilizes the one of the plurality of server base forms which is identical to the client base form if said means for determining determines that one of the plurality of server base forms is identical to the client base form.

23. The apparatus of claim 20 further comprising:

means for updating the server cache entry with the data stream from the first application in response to the request from the second application;

means for maintaining a plurality of difference data sets which correspond to the request from the second application and which represent the differences between successive server cache entries to provide archival difference data;

means for maintaining a plurality of CRC entries wherein each of said plurality of CRC entries is associated with one of said plurality of difference data sets and uniquely identify the server base form from which said difference data set was derived;

wherein said means for interrogating comprises means for determining if a plurality of difference data sets and CRCs exist corresponding to the request from the second application;

means for determining if one of said plurality of CRCs is corresponds to a server base form which is identical to the client base form;

wherein said means for sending comprises means for sending the archival difference data corresponding to the CRC which corresponds to the client base form the successive archival difference data sets and the difference data calculated by said means for comparing to the second computer over the external communication link;

wherein said means for reconstructing comprises means for reconstructing the response data stream corresponding to the communication from the first application from the data stream received over the external communication link by successively combining the client base form with the difference data received over the external communication link to create a response data stream corresponding to the intercepted response; and means for updating the client cache entry corresponding to the request from the second application with the reconstructed data stream.

24. The apparatus of claim 20 wherein the first application comprises a web server and the second application comprises a web browser.

25. The apparatus of claim 20 wherein the external communication link comprises a wireless communication link.

26. The apparatus of claim 24 wherein the request from the web browser comprises a CGI request.

27. A computer program product for reducing the data transmitted over a communication link from a first application resident in a first computer and to a second application resident in a second computer wherein the data is transmitted over an external communication link from the first computer to the second computer, comprising:

a computer-readable storage medium having computer-readable program code means embodied in said medium, said computer-readable program code means comprising:

computer readable program code means for storing a data stream from the first application to be provided to the second application in response to a request from the second application in a cache resident in the first computer to create a server base cache entry;

computer readable program code means for storing a data stream to be provided to the second application in response to a request from the second application in a cache resident in the second computer to create a client base cache entry;

computer readable program code means for evaluating the requests from the second application to determine if a client base cache entry corresponding to the interrogated request exists to provide a client base form;

computer readable program code means for interrogating requests from the second application to determine if a server base cache entry corresponding to the interrogated request exists to provide a server base form;

computer readable program code means for intercepting the data stream corresponding to the response originated by the first application in response to the interrogated request from the second application prior to transmission of the response on the external communication link;

computer readable program code means for comparing the intercepted response to the server base form to provide difference data corresponding to the difference between the intercepted response and the server base form;

computer readable program code means for sending the difference data to the second computer over the external communication link;

computer readable program code means for acquiring the difference data transmitted over the external communication link sent by the first computer;

computer readable program code means for providing the reconstructed data stream corresponding to the intercepted response to the second application. computer readable program code means for determining if the server base form is identical to the client base form;

computer readable program code means for transmitting the server base form to the second computer over the external communication link if the server base form is not identical to the client base form;

computer readable program code means for reconstructing the response data stream corresponding to the communication from the first application from the client/server specific data stream received over the external communication link by combining the client base form with the difference data received over the external communication link to create a response data stream corresponding to the intercepted response if the server base form is not transmitted to the second computer and for reconstructing the intercepted response data stream corresponding to the response from the first application by combining the server base form received over the external communication link with the difference data received over the external communication link to create a data stream corresponding to the intercepted response if the server base form is transmitted to the second computer; and computer readable program code means for updating the client base form corresponding to the interrogated request by storing the received server base form as the client base cache entry corresponding to the interrogated request.

28. The computer program product of claim 27 further comprising:

computer readable program code means for determining if the difference between the server base form and the intercepted response is greater than a predefined difference threshold;

computer readable program code means for updating the server base form corresponding to the interrogated request by storing the intercepted response data stream received from the first application as the server base cache entry corresponding to the intercepted request if the difference between the server base form and the intercepted response is greater than the predefined difference threshold; and wherein said computer readable program code means for comparing and said computer readable program code means for sending utilizes the updated server base form.

29. The computer program product of claim 27 further comprising:

computer readable program code means for maintaining a plurality of server base cache entries which correspond to the request from the second application;

wherein said computer readable program code means for interrogating comprises computer readable program code means for ascertaining if a plurality of sever base cache entries exist corresponding to the request from the second application to provide a plurality of server base forms;

computer readable program code means for determining if one of the plurality of server base forms is identical to the client base form; and wherein said computer readable program code means for comparing utilizes the one of the plurality of server base forms which is identical to the client base form if said computer readable program code means for determining determines that one of the plurality of server base forms is identical to the client base form.

30. The computer program product of claim 27 further comprising:

computer readable program code means for updating the server cache entry with the data stream from the first application in response to the request from the second application;

computer readable program code means for maintaining a plurality of difference data sets which correspond to the request from the second application and which represent the differences between successive server cache entries to provide archival difference data;

computer readable program code means for maintaining a plurality of CRC entries wherein each of said plurality of CRC entries is associated with one of said plurality of difference data sets and uniquely identify the server base form from which said difference data set was derived;

wherein said computer readable program code means for interrogating comprises computer readable program code means for determining if a plurality of difference data sets and CRCs exist corresponding to the request from the second application;

computer readable program code means for determining if one of said plurality of CRCs is corresponds to a server base form which is identical to the client base form;

wherein said computer readable program code means for sending comprises computer readable program code means for sending the archival difference data corresponding to the CRC which corresponds to the client base form the successive archival difference data sets and the difference data calculated by said computer readable program code means for comparing to the second computer over the external communication link;

wherein said computer readable program code means for reconstructing comprises computer readable program code means for reconstructing the response data stream corresponding to the communication from the first application from the data stream received over the external communication link by successively combining the client base form with the difference data received over the external communication link to create a response data stream corresponding to the intercepted response; and computer readable program code means for updating the client cache entry corresponding to the request from the second application with the reconstructed data stream.

31. The computer program product of claim 27 wherein the first application comprises a web server and the second application comprises a web browser.

32. The computer program product of claim 27 wherein the external communication link comprises a wireless communication link.

33. The computer program product of claim 31 wherein the request from the web browser comprises a CGI request.

34. A method of reducing the data transmitted over a communication link from a first application resident in a first computer and to a second application resident in a second computer wherein the data is transmitted over an external communication link from the first computer to the second computer, the method comprising:

storing a plurality of data stream from the first application to be provided to the second application corresponding to a request from the second application in a cache resident in the first computer to create a plurality of server base cache entries;

storing a data stream to be provided to the second application in response to a request from the second application in a cache resident in the second computer to create a client base cache entry;

evaluating the requests from the second application to determine if a client base cache entry corresponding to the interrogated request exists to provide a client base form;

interrogating requests from the second application to determine if a plurality of server base cache entries corresponding to the interrogated request exist to provide a plurality of server base forms;

determining if one of the plurality of server base forms is identical to the client base form;

intercepting the data stream corresponding to the response originated by the first application in response to the interrogated request from the second application prior to transmission of the response on the external communication link;

comparing the intercepted response to the one of the plurality of server base forms which is identical to the client base form to provide difference data corresponding to the difference between the intercepted response and the server base form;

sending the difference data to the second computer over the external communication link;

acquiring the difference data transmitted over the external communication link sent by the first computer;

reconstructing the response data stream corresponding to the communication from the first application from the client/server specific data stream received over the external communication link by combining the client base form with the difference data received over the external communication link to create a response data stream corresponding to the intercepted response; and providing the reconstructed data stream corresponding to the intercepted response to the second application.

35. The method of claim 34 further comprising the steps of:

determining if the difference between the server base form and the intercepted response is greater than a predefined difference threshold;

updating the server base form corresponding to the interrogated request by storing the intercepted response data stream received from the first application as the server base cache entry corresponding to the intercepted request if the difference between the server base form and the intercepted response is greater than the predefined difference threshold; and wherein said comparing step and said sending step utilizes the updated server base form.

36. The method of claim 34 further comprising the steps of:

updating the server cache entry with the data stream from the first application in response to the request from the second application;

maintaining a plurality of difference data sets which correspond to the request from the second application and which represent the differences between successive server cache entries to provide archival difference data;

maintaining a plurality of CRC entries wherein each of said plurality of CRC entries is associated with one of said plurality of difference data sets and uniquely identify the server base form from which said difference data set was derived;

wherein said interrogating step comprises determining if a plurality of difference data sets and CRCs exist corresponding to the request from the second application;

determining if one of said plurality of CRCs is corresponds to a server base form which is identical to the client base form;

wherein said sending step comprises sending the archival difference data corresponding to the CRC which corresponds to the client base form the successive archival difference data sets and the difference data calculated by said comparing step to the second computer over the external communication link;

wherein said reconstructing step comprises reconstructing the response data stream corresponding to the communication from the first application from the data stream received over the external communication link by successively combining the client base form with the difference data received over the external communication link to create a response data stream corresponding to the intercepted response;

updating the client cache entry corresponding to the request from the second application with the reconstructed data stream.

37. An apparatus for reducing the data transmitted over a communication link from a first application resident in a first computer and to a second application resident in a second computer wherein the data is transmitted over an external communication link from the first computer to the second computer, comprising:

means for storing a plurality of data stream from the first application to be provided to the second application corresponding to a request from the second application in a cache resident in the first computer to create a plurality of server base cache entries;

means for storing a data stream to be provided to the second application in response to a request from the second application in a cache resident in the second computer to create a client base cache entry;

means for evaluating the requests from the second application to determine if a client base cache entry corresponding to the interrogated request exists to provide a client base form;

means for interrogating requests from the second application to determine if a plurality of server base cache entries corresponding to the interrogated request exist to provide a plurality of server base forms;

means for determining if one of the plurality of server base forms is identical to the client base form;

means for intercepting the data stream corresponding to the response originated by the first application in response to the interrogated request from the second application prior to transmission of the response on the external communication link;

means for comparing the intercepted response to the one of the plurality of server base forms which is identical to the client base form to provide difference data corresponding to the difference between the intercepted response and the server base form;

means for sending the difference data to the second computer over the external communication link;

means for acquiring the difference data transmitted over the external communication link sent by the first computer;

means for reconstructing the response data stream corresponding to the communication from the first application from the client/server specific data stream received over the external communication link by combining the client base form with the difference data received over the external communication link to create a response data stream corresponding to the intercepted response; and means for providing the reconstructed data stream corresponding to the intercepted response to the second application.

38. The apparatus of claim 37 further comprising:

means for determining if the difference between the server base form and the intercepted response is greater than a predefined difference threshold;

means for updating the server base form corresponding to the interrogated request by storing the intercepted response data stream received from the first application as the server base cache entry corresponding to the intercepted request if the difference between the server base form and the intercepted response is greater than the predefined difference threshold; and wherein said means for comparing and said means for sending utilizes the updated server base form.

39. The apparatus of claim 37 further comprising:

means for updating the server cache entry with the data stream from the first application in response to the request from the second application;

means for maintaining a plurality of difference data sets which correspond to the request from the second application and which represent the differences between successive server cache entries to provide archival difference data;

means for maintaining a plurality of CRC entries wherein each of said plurality of CRC entries is associated with one of said plurality of difference data sets and uniquely identify the server base form from which said difference data set was derived;

wherein said means for interrogating comprises means for determining if a plurality of difference data sets and CRCs exist corresponding to the request from the second application;

means for determining if one of said plurality of CRCs is corresponds to a server base form which is identical to the client base form;

wherein said means for sending comprises means for sending the archival difference data corresponding to the CRC which corresponds to the client base form the successive archival difference data sets and the difference data calculated by said means for comparing to the second computer over the external communication link;

wherein said means for reconstructing comprises means for reconstructing the response data stream corresponding to the communication from the first application from the data stream received over the external communication link by successively combining the client base form with the difference data received over the external communication link to create a response data stream corresponding to the intercepted response; and means for updating the client cache entry corresponding to the request from the second application with the reconstructed data stream.

40. A computer program product for reducing the data transmitted over a communication link from a first application resident in a first computer and to a second application resident in a second computer wherein the data is transmitted over an external communication link from the first computer to the second computer, comprising:

a computer-readable storage medium having computer-readable program code means embodied in said medium, said computer-readable program code means comprising:

computer readable program code means for storing a plurality of data stream from the first application to be provided to the second application corresponding to a request from the second application in a cache resident in the first computer to create a plurality of server base cache entries;

computer readable program code means for storing a data stream to be provided to the second application in response to a request from the second application in a cache resident in the second computer to create a client base cache entry;

computer readable program code means for evaluating the requests from the second application to determine if a client base cache entry corresponding to the interrogated request exists to provide a client base form;

computer readable program code means for interrogating requests from the second application to determine if a plurality of server base cache entries corresponding to the interrogated request exist to provide a plurality of server base forms;

computer readable program code means for determining if one of the plurality of server base forms is identical to the client base form;

computer readable program code means for intercepting the data stream corresponding to the response originated by the first application in response to the interrogated request from the second application prior to transmission of the response on the external communication link;

computer readable program code means for comparing the intercepted response to the one of the plurality of server base forms which is identical to the client base form to provide difference data corresponding to the difference between the intercepted response and the server base form;

computer readable program code means for sending the difference data to the second computer over the external communication link;

computer readable program code means for acquiring the difference data transmitted over the external communication link sent by the first computer;

computer readable program code means for reconstructing the response data stream corresponding to the communication from the first application from the client/server specific data stream received over the external communication link by combining the client base form with the difference data received over the external communication link to create a response data stream corresponding to the intercepted response; and computer readable program code means for providing the reconstructed data stream corresponding to the intercepted response to the second application.

41. The computer program product of claim 40 further comprising:

computer readable program code means for determining if the difference between the server base form and the intercepted response is greater than a predefined difference threshold;

computer readable program code means for updating the server base form corresponding to the interrogated request by storing the intercepted response data stream received from the first application as the server base cache entry corresponding to the intercepted request if the difference between the server base form and the intercepted response is greater than the predefined difference threshold; and wherein said computer readable program code means for comparing and said computer readable program code means for sending utilizes the updated server base form.

42. The computer program product of claim 40 further comprising:

computer readable program code means for updating the server cache entry with the data stream from the first application in response to the request from the second application;

computer readable program code means for maintaining a plurality of difference data sets which correspond to the request from the second application and which represent the differences between successive server cache entries to provide archival difference data;

computer readable program code means for maintaining a plurality of CRC entries wherein each of said plurality of CRC entries is associated with one of said plurality of difference data sets and uniquely identify the server base form from which said difference data set was derived;

wherein said computer readable program code means for interrogating comprises computer readable program code means for determining if a plurality of difference data sets and CRCs exist corresponding to the request from the second application;

computer readable program code means for determining if one of said plurality of CRCs is corresponds to a server base form which is identical to the client base form;

wherein said computer readable program code means for sending comprises computer readable program code means for sending the archival difference data corresponding to the CRC which corresponds to the client base form the successive archival difference data sets and the difference data calculated by said computer readable program code means for comparing to the second computer over the external communication link;

wherein said computer readable program code means for reconstructing comprises computer readable program code means for reconstructing the response data stream corresponding to the communication from the first application from the data stream received over the external communication link by successively combining the client base form with the difference data received over the external communication link to create a response data stream corresponding to the intercepted response; and computer readable program code means for updating the client cache entry corresponding to the request from the second application with the reconstructed data stream.

43. A method of reducing the data transmitted over an external communication link from a first application resident in a first computer to a second application resident in a second computer, the method comprising:

storing a data stream from the first application to be provided to the second application in response to a request from the second application in a cache resident in the first computer to create a server base cache entry;

storing a data stream to be provided to the second application in response to a request from the second application in a cache resident in the second computer to create a client base cache entry;

evaluating the requests from the second application to determine if a client base cache entry corresponding to the interrogated request exists to provide a client base form;

maintaining a plurality of difference data sets which correspond to the request from the second application and which represent the differences between successive server cache entries to provide archival difference data;

maintaining a plurality of CRC entries wherein each of said plurality of CRC entries is associated with one of said plurality of difference data sets and uniquely identify the server base form from which said difference data set was derived;

interrogating requests from the second application to determine if a plurality of difference data sets and CRCs exist corresponding to the request from the second application;

determining if one of said plurality of CRCs is corresponds to a server base form which is identical to the client base form;

intercepting the data stream corresponding to the response originated by the first application in response to the interrogated request from the second application prior to transmission of the response on the external communication link;

comparing the intercepted response to the server base form to provide difference data corresponding to the difference between the intercepted response and the server base form;

updating the server cache entry with the data stream from the first application in response to the request from the second application;

sending the archival difference data corresponding to the CRC which corresponds to the client base form, the successive archival difference data sets and the difference data calculated by said comparing step to the second application over the external communication link;

acquiring the difference data from the external communication link;

reconstructing the response data stream corresponding to the communication from the first application by successively combining the client base form with the acquired difference data to create a response data stream corresponding to the intercepted response;

updating the client cache entry corresponding to the request from the second application with the reconstructed data stream; and providing the reconstructed data stream corresponding to the intercepted response to the second application.

44. The method of claim 43 further comprising the steps of:

determining if the difference between the server base form and the intercepted response is greater than a predefined difference threshold;

updating the server base form corresponding to the interrogated request by storing the intercepted response data stream received from the first application as the server base cache entry corresponding to the intercepted request if the difference between the server base form and the intercepted response is greater than the predefined difference threshold; and wherein said comparing step and said sending step utilizes the updated server base form.

45. An apparatus for reducing the data transmitted over an external communication link from a first application resident in a first computer to a second application resident in a second computer, comprising:

means for storing a data stream from the first application to be provided to the second application in response to a request from the second application in a cache resident in the first computer to create a server base cache entry;

means for storing a data stream to be provided to the second application in response to a request from the second application in a cache resident in the second computer to create a client base cache entry;

means for evaluating the requests from the second application to determine if a client base cache entry corresponding to the interrogated request exists to provide a client base form;

means for maintaining a plurality of difference data sets which correspond to the request from the second application and which represent the differences between successive server cache entries to provide archival difference data;

means for maintaining a plurality of CRC entries wherein each of said plurality of CRC entries is associated with one of said plurality of difference data sets and uniquely identify the server base form from which said difference data set was derived;

means for interrogating requests from the second application to determine if a plurality of difference data sets and CRCs exist corresponding to the request from the second application;

means for determining if one of said plurality of CRCs is corresponds to a server base form which is identical to the client base form;

means for intercepting the data stream corresponding to the response originated by the first application in response to the interrogated request from the second application prior to transmission of the response on the external communication link;

means for comparing the intercepted response to the server base form to provide difference data corresponding to the difference between the intercepted response and the server base form;

means for updating the server cache entry with the data stream from the first application in response to the request from the second application;

means for sending the archival difference data corresponding to the CRC which corresponds to the client base form, the successive archival difference data sets and the difference data calculated by said comparing step to the second application over the external communication link;

means for acquiring the difference data from the external communication link;

means for reconstructing the response data stream corresponding to the communication from the first application by successively combining the client base form with the acquired difference data to create a response data stream corresponding to the intercepted response;

means for updating the client cache entry corresponding to the request from the second application with the reconstructed data stream; and means for providing the reconstructed data stream corresponding to the intercepted response to the second application.

46. The apparatus of claim 45 further comprising:

means for determining if the difference between the server base form and the intercepted response is greater than a predefined difference threshold;

means for updating the server base form corresponding to the interrogated request by storing the intercepted response data stream received from the first application as the server base cache entry corresponding to the intercepted request if the difference between the server base form and the intercepted response is greater than the predefined difference threshold; and wherein said means for comparing and said means for sending utilizes the updated server base form.

47. A computer program product for reducing the data transmitted over an external communication link from a first application resident in a first computer to a second application resident in a second computer, the computer program product comprising:

a computer-readable storage medium having computer-readable program code means embodied in said medium, said computer-readable program code means comprising:

computer readable program code means for storing a data stream from the first application to be provided to the second application in response to a request from the second application in a cache resident in the first computer to create a server base cache entry;

computer readable program code means for storing a data stream to be provided to the second application in response to a request from the second application in a cache resident in the second computer to create a client base cache entry;

computer readable program code means for evaluating the requests from the second application to determine if a client base cache entry corresponding to the interrogated request exists to provide a client base form;

computer readable program code means for maintaining a plurality of difference data sets which correspond to the request from the second application and which represent the differences between successive server cache entries to provide archival difference data;

computer readable program code means for maintaining a plurality of CRC entries wherein each of said plurality of CRC entries is associated with one of said plurality of difference data sets and uniquely identify the server base form from which said difference data set was derived;

computer readable program code means for interrogating requests from the second application to determine if a plurality of difference data sets and CRCs exist corresponding to the request from the second application;

computer readable program code means for determining if one of said plurality of CRCs is corresponds to a server base form which is identical to the client base form;

computer readable program code means for intercepting the data stream corresponding to the response originated by the first application in response to the interrogated request from the second application prior to transmission of the response on the external communication link;

computer readable program code means for comparing the intercepted response to the server base form to provide difference data corresponding to the difference between the intercepted response and the server base form;

computer readable program code means for updating the server cache entry with the data stream from the first application in response to the request from the second application;

computer readable program code means for sending the archival difference data corresponding to the CRC which corresponds to the client base form, the successive archival difference data sets and the difference data calculated by said comparing step to the second application over the external communication link;

computer readable program code means for acquiring the difference data from the external communication link;

computer readable program code means for reconstructing the response data stream corresponding to the communication from the first application by successively combining the client base form with the acquired difference data to create a response data stream corresponding to the intercepted response;

computer readable program code means for updating the client cache entry corresponding to the request from the second application with the reconstructed data stream; and computer readable program code means for providing the reconstructed data stream corresponding to the intercepted response to the second application.

48. The computer program product of claim 47 further comprising:

computer readable program code means for determining if the difference between the server base form and the intercepted response is greater than a predefined difference threshold;

computer readable program code means for updating the server base form corresponding to the interrogated request by storing the intercepted response data stream received from the first application as the server base cache entry corresponding to the intercepted request if the difference between the server base form and the intercepted response is greater than the predefined difference threshold; and wherein said computer readable program code means for comparing and said computer readable program code means for sending utilizes the updated server base form.

* * * * *